US011979865B2

(12) United States Patent
Muruganathan et al.

(10) Patent No.: US 11,979,865 B2
(45) Date of Patent: May 7, 2024

(54) FREQUENCY-DOMAIN RESOURCE ALLOCATION FOR MULTI-SOURCE TRANSMISSION

(71) Applicant: Telefonaktiebolaget LM Ericsson (publ), Stockholm (SE)

(72) Inventors: Siva Muruganathan, Stittsville (CA); Yufei Blankenship, Kildeer, IL (US); Sebastian Faxér, Stockholm (SE); Mattias Frenne, Uppsala (SE); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 271 days.

(21) Appl. No.: 17/421,664

(22) PCT Filed: Jan. 10, 2020

(86) PCT No.: PCT/IB2020/050182
§ 371 (c)(1),
(2) Date: Jul. 8, 2021

(87) PCT Pub. No.: WO2020/144639
PCT Pub. Date: Jul. 16, 2020

(65) Prior Publication Data
US 2022/0095304 A1 Mar. 24, 2022

Related U.S. Application Data

(60) Provisional application No. 62/791,062, filed on Jan. 11, 2019.

(51) Int. Cl.
*H04W 72/0453* (2023.01)
*H04W 72/23* (2023.01)
*H04B 7/024* (2017.01)

(52) U.S. Cl.
CPC ....... *H04W 72/0453* (2013.01); *H04W 72/23* (2023.01); *H04B 7/024* (2013.01)

(58) Field of Classification Search
CPC .................. H04W 72/0453; H04W 72/23
See application file for complete search history.

(56) References Cited

U.S. PATENT DOCUMENTS 9,497,773 B2    11/2016  Zhang et al.
11,664,853 B2 *  5/2023  Park .................. H04L 5/001
                                          370/328
(Continued)

FOREIGN PATENT DOCUMENTS

CN    106489246 A    3/2017
CN    108282870 A    7/2018
(Continued)

OTHER PUBLICATIONS

"3GPP TS 38.214 V15.3.0", 3rd Generation Partnership Project; Technical Specification Group Radio Access Network; NR; Physical layer procedures for data (Release 15), Sep. 2018, pp. 1-96.
(Continued)

*Primary Examiner* — Kevin C. Harper
(74) *Attorney, Agent, or Firm* — Murphy, Bilak & Homiller, PLLC

(57) ABSTRACT

Embodiments include methods, by a user equipment (UE), for receiving physical data channel transmissions from a wireless network. Such methods include receiving, from the wireless network, configuration information including: a first indication of one or more frequency-domain resource allocations for respective corresponding one or more physical data channel transmissions by respective corresponding one or more sources configured by the wireless network, and one or more second indications of further characteristics of the physical data channel transmissions. Such methods also include, based on the second indications, determining the
(Continued)

number of frequency-domain resource allocations indicated by the first indication. Such methods also include receiving, from the wireless network, the determined number of physical data channel transmissions based on the respective indicated frequency-domain resource allocations. Other embodiments include complementary methods performed by a wireless network, and UEs and wireless networks configured to perform such methods.

27 Claims, 12 Drawing Sheets

(56) References Cited

U.S. PATENT DOCUMENTS

| | | | |
|---|---|---|---|
| 2017/0094642 A1 | 3/2017 | Lee et al. | |
| 2017/0223725 A1 | 8/2017 | Xiong et al. | |
| 2017/0366311 A1 | 12/2017 | Iyer et al. | |
| 2018/0270799 A1 | 9/2018 | Noh et al. | |
| 2019/0334680 A1 | 10/2019 | Li et al. | |
| 2020/0045700 A1 | 2/2020 | Sun et al. | |
| 2020/0106559 A1 | 4/2020 | Vilaipornsawai et al. | |
| 2020/0228970 A1* | 7/2020 | Noh | H04W 8/24 |
| 2021/0160030 A1 | 5/2021 | Myung et al. | |
| 2022/0095350 A1 | 3/2022 | Lee et al. | |

FOREIGN PATENT DOCUMENTS

| | | |
|---|---|---|
| CO | 6781466 A2 | 10/2013 |
| KR | 101886451 B1 | 8/2018 |
| WO | 2008020738 A1 | 2/2008 |
| WO | 2012088284 A2 | 6/2012 |
| WO | 2015018361 A1 | 2/2015 |
| WO | 2018156696 A1 | 8/2018 |
| WO | 2018203626 A1 | 11/2018 |

OTHER PUBLICATIONS

"Discussion on the PDCCH repetition for NR URLLC", 3GPP TSG RAN WG1 Meeting #94bis, R1-1811401, Chengdu, China, Oct. 8-12, 2018, pp. 1-5.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.
"Additional evaluation results for NC-JT under 5G UMa scenario", 3GPP TSG RAN WG1 Meeting Ad-Hoc Meeting 1901, R1-1900731, Taipei, Taiwan, Jan. 21-25, 2019, pp. 1-2.
"Enhancement to PDSCH RE mapping and resource allocation for non-coherent JT", 3GPP TSG RAN WG1 Meeting #89; R1-1707009; Hangzhou, China, May 15-19, 2017, pp. 1-5.
"Enhancements on multi-TAP/panel transmission", 3GPP TSG RAN WG1 Meeting #95; R1-1813333; Spokane, USA, Nov. 12-16, 2018, pp. 1-20.
"Enhancements on multi-TRP/Panel transmission", 3GPP TSG RAN WG1 Meeting #95; R1-1812256; Spokane, USA, Nov. 12-16, 2018, pp. 1-14.
"Enhancements on Multi-TRP/Panel Transmission", 3GPP TSG RAN WG1 Meeting #95; R1-1813489; Spokane, USA, Nov. 12-16, 2018, pp. 1-18.
"Enhancements on multi-TRP/panel transmission", 3GPPTSG RAN WGI Meeting #95; R1-1812243; Spokane, USA, Nov. 12-16, 2018, pp. 1-9.
"Enhancements to control signaling", 3GPP TSG RAN WG1 NR #88bis; R1-1704424; Spokane, USA, Apr. 3-7, 2017, pp. 1-3.
"Enhancements to control signaling related to PDSCH RE mapping and resource allocation", 3GPP TSG RAN WG1 Meeting #89; R1-1707143; Hangzhou, P. R. China, May 15-19, 2017, pp. 1-5.
"On the number of TRPs for high reliability at 4 GHz", 3GPP TSG RAN WG1 Ad-Hoc Meeting 1901, Tdoc R1-1901116, Taipei, Taiwan, Jan. 21-25, 2019, pp. 1-5.
"Summary of AI: 7.2.8.2 Enhancements on Multi-TRP/Panel Transmission", 3GPP TSG RAN WG1 Meeting #94bis; R1-1811882; Chengdu, China, Oct. 8-12, 2018, pp. 1-22.
"3GPP TS 36.213 V15.2.0", 3rd Generation Partnership Project; Technical Specification Group Radio Access Network; Evolved Universal Terrestrial Radio Access (E-UTRA); Physical layer procedures (Release 15), Jun. 2018, pp. 1-541.
"3GPP TS 38.212 V15.3.0", 3rd Generation Partnership Project; Technical Specification Group Radio Access Network; NR; Multiplexing and channel coding (Release 15), Sep. 2018, pp. 1-99.
"3GPP TS 38.211 V15.2.0", 3rd Generation Partnership Project; Technical Specification Group Radio Access Network; NR; Physical channels and modulation (Release 15), Jun. 2018, pp. 1-96.
"3GPP TS 38.321 V15.2.0", 3rd Generation Partnership Project; Technical Specification Group Radio Access Network; NR; Medium Access Control (MAC) protocol specification (Release 15), Jun. 2018, pp. 1-73.

* cited by examiner

FREQUENCY-DOMAIN RESOURCE ALLOCATION FOR MULTI-SOURCE TRANSMISSION

TECHNICAL FIELD

Embodiments of the present disclosure generally relates to wireless communication networks, and particularly relates to performance improvements for multi-source transmission in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

The LTE PHY resource can also be defined in terms of resource block groups (RBGs). In general, an RBG includes a number of contiguous RBs, with the number depending on the system bandwidth, $N^{DL}_{RB}$. For example, an RBG can range in size from a single RB, for $N^{DL}_{RB}$ up to 10 RBs, up to four RBs for $N^{DL}_{RB} \geq 64$ RBs.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 4 illustrates one exemplary manner in which the CCEs and REGs can be mapped to a physical resource, e.g., PRBs. As shown in FIG. 4, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. NR also shares various other features of LTE that were discussed above.

In 3GPP NR Rel-16, it has been discussed to support multi-source transmission of PDSCH to UEs. In this context, the term "source" can refer to a beam, a panel, a transmission/reception point (TRP), etc. One type of multi-source transmission is "non-coherent joint transmission" (or NCJT), which refers to MIMO data transmission in which different layers (e.g., different codewords) are transmitted from different sources (e.g., TRPs).

For NC-JT transmission, frequency domain resources must be allocated for transmissions from each of the sources (e.g., TRPs). Current solutions for frequency-domain resource allocation are limited to the specific case of each data codeword being transmitted from a single TRP (i.e., one-to-one TRP/codeword mapping). Furthermore, certain signaling used in LTE for such frequency-domain allocations is not available in NR. Accordingly, there is a need for a more flexible techniques to support frequency-domain resource allocations for multi-TRP transmissions (e.g., of PDSCH) in NR.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures receiving physical data channel transmissions from a wireless network. The exemplary methods can be performed by a user equipment (UE, e.g., wireless device, IoT device, modem, etc. or component thereof) in communication with one or more network nodes (e.g., base station, gNB, en-gNB, etc., or component thereof) in the wireless network (e.g., NG-RAN).

In some embodiments, the exemplary methods can include receiving, from the wireless network, a higher-layer control message including one or more further characteristics of the physical data channel transmissions. For example, the higher-layer control message can be an RRC message. Various further characteristics can be included according to various embodiments. In some embodiments, the control message can include a plurality of traffic control indicator (TCI) states. For example, each TCI state can include one or more pairs of source reference signal (RS) quasi-colocation (QCL) relationships, as explained in more detail herein.

The exemplary methods can also include receiving receive configuration information from the wireless network. The configuration information can include a first indication of one or more frequency-domain resource allocations for respective corresponding one or more physical data channel transmissions by respective corresponding one or more sources configured by the wireless network. The configuration information can also include one or more second indications of further characteristics of the physical data channel transmissions.

In some embodiments, the second indications can identify (e.g., point to) particular configurations and/or options received in the higher-layer control message. Even so, the further characteristics identified by the second indications can be the same as or different from the further characteristics identified in the control message.

In various embodiments, the configuration information can be received via a downlink message having one or more of the following characteristics: a single message; received via a single physical downlink control channel (PDCCH); and received via a downlink control information (DCI) scheduling grant.

In some embodiments, where the first and second indications are received in a single DCI message, the second indications can be included in a TCI state field of the DCI message, where the TCI state field identifies one or more TCI states. In such embodiments, the frequency domain resource allocations can be non-overlapping, and each non-overlapping frequency domain resource allocation can be associated with a corresponding TCI state indicated by the second indications.

Furthermore, in some of these embodiments, each TCI state, indicated by the second indication, includes one or more source RS pairs, each of which has a corresponding pair of QCL relations with antenna ports for demodulation reference signals (DM-RS). In some of these embodiments, the respective sources configured by the wireless network correspond to one of the following: the respective TCI states indicated by the second indications; or the respective pairs of QCL relationships included in the TCI states indicated by the second indications.

In some of these embodiments, the configuration information also includes a third indication of a plurality of the antenna ports for DM-RS, where the indicated plurality of antenna ports are associated with all frequency domain resource allocations indicated by the first indication.

In some of these embodiments, the one or more TCI states, indicated by the second indication, can correspond to a code-division multiplexing (CDM) group that is associated with each of the physical data channel transmissions. In such embodiments, each physical data channel transmission can be received (e.g., as described below) in association with DMRS that have antenna ports with QCL relations included in the corresponding TCI state.

In some embodiments, where the higher-layer control message includes a plurality of TCI states, the second indications can include an indication of one or more of the TCI states included in the higher-layer control message.

The exemplary method can also include, based on the second indications, determining the number of frequency-domain resource allocations identified by the first indication. In some embodiments, this determination is not based on the first indication. In other words, the determination of the number of frequency-domain resource allocations can be based on the second indications and, in certain embodiments, configuration information received in the higher-layer control message.

In some embodiments, the exemplary methods can also include, based on the first indication and the determined number, determining the one or more frequency domain allocations identified by the first indication. The exemplary methods can also include receiving, from the wireless network, the determined number of physical data channel transmissions based on the respective indicated frequency-domain resource allocations. In embodiments, the UE can also receive the determined number of physical data channel transmission based on the determined resource blocks. In some embodiments, where a plurality of physical data channel transmissions are received, each transmission can carry a different redundancy version (RV) of a single data block. This diversity arrangement can facilitate improved reliability, as discussed in more detail below.

Other exemplary embodiments include methods (e.g., procedures) for performing physical data channel transmissions to a user equipment (UE). The exemplary methods can be performed by a wireless network (e.g., NG-RAN) comprising one or more nodes (e.g., base stations, gNBs, en-gNBs, TRPs, etc., or components thereof) that communicate with the UE (e.g., wireless device, IoT device, modem, etc. or component thereof).

In some embodiments, the exemplary methods can include transmitting, to the UE, a higher-layer control message including one or more further characteristics of the physical data channel transmissions. For example, the higher-layer control message can be an RRC message. Various further characteristics can be included according to various embodiments.

In some embodiments, the control message can include a plurality of traffic control indicator (TCI) states. For example, each TCI state can include one or more pairs of source RS QCL relationships, as discussed above.

The exemplary methods can also include transmitting configuration information to the UE. The configuration information can include a first indication of one or more frequency-domain resource allocations for respective corresponding one or more physical data channel transmissions by respective corresponding one or more sources configured by the wireless network. The configuration information can also include one or more second indications of further characteristics of the physical data channel transmissions.

Furthermore, the number of frequency-domain resource allocations, indicated by the first indication, can be determined based on the one or more second indications. In some embodiments, the number of frequency-domain resource allocations, indicated by the first indication, can be determined based on the one or more second indications (and, in certain embodiments, configuration information received in the higher-layer control message) without reference to the first indication. In other words, in such embodiments, the number or quantity of frequency-domain resource allocations can be determined independent of the first indication.

In some, the second indications can identify (e.g., point to) particular configurations and/or options received in the higher-layer control message. Even so, the further characteristics identified by the second indications can be the same as or different from the further characteristics identified in the higher-layer control message.

In various embodiments, the configuration information can be transmitted via a downlink message having one or more of the following characteristics: a single message; received via a single physical downlink control channel (PDCCH); and received via a downlink control information (DCI) scheduling grant.

In some embodiments, where the first and second indications are transmitted in a single DCI message, the second indications can be included in a TCI state field of the DCI message, where the TCI state field identifies one or more TCI states. In such embodiments, the frequency domain resource allocations can be non-overlapping, and each non-overlapping frequency domain resource allocation can be associated with a corresponding TCI state indicated by the second indications.

Furthermore, in some of these embodiments, each TCI state, indicated by the second indication, includes one or more source reference signal (RS) pairs, each of which has a corresponding pair of quasi-colocation (QCL) relations with antenna ports for demodulation reference signals (DM-RS). In some of these embodiments, the respective sources configured by the wireless network correspond to one of the following: the respective TCI states indicated by the second indications; or the respective pairs of QCL relationships included in the TCI states indicated by the second indications.

In some of these embodiments, the configuration information also includes a third indication of a plurality of the antenna ports for DM-RS, where the indicated plurality of antenna ports are associated with all frequency domain resource allocations indicated by the first indication.

In some of these embodiments, the one or more TCI states, indicated by the second indication, can correspond to a code-division multiplexing (CDM) group that is associated with each of the physical data channel transmissions. In such embodiments, each physical data channel transmission can be transmitted (e.g., as described below) in association with DMRS that have antenna ports with QCL relations included in the corresponding TCI state.

In some embodiments, where the higher-layer control message includes a plurality of TCI states, the second indications can include an indication of one or more of the TCI states included in the higher-layer control message. In this manner, for example, a DCI including the second indications can be used by the wireless network to dynamically select TCI states previously configured via RRC.

In some embodiments, the number of frequency-domain resource allocations indicated by the first indication are based on one or more of the following: the number of TCI states indicated by the second indications; and the number of pairs of QCL relations included in the TCI states indicated by the second indications. For example, each TCI state or each QCL pair can correspond to a transmission from a different source.

The exemplary methods can also include transmitting, to the UE, the physical data channel transmissions based on the respective indicated frequency-domain resource allocations and on the indicated further characteristics (e.g., as indicated by the second indications). In some embodiments, where a plurality of physical data channel transmissions are transmitted, each transmission can carry a different redundancy version (RV) of a single data block. This diversity arrangement can facilitate improved reliability, as discussed in more detail above.

Other exemplary embodiments include user equipment (UEs, e.g., wireless devices, IoT devices, or components thereof, such as a modem) and wireless networks comprising one or more nodes (e.g., base stations, eNBs, gNBs, CU/DUs, TRPs, etc. or components thereof) configured to perform operations corresponding to any of the exemplary methods described herein. Other exemplary embodiments include non-transitory, computer-readable media storing program instructions that, when executed by processing circuitry, configure such UEs or wireless networks to perform operations corresponding to any the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes

FIG. 9, which includes

FIG. 10, which includes

DETAILED DESCRIPTION

Figure 1:
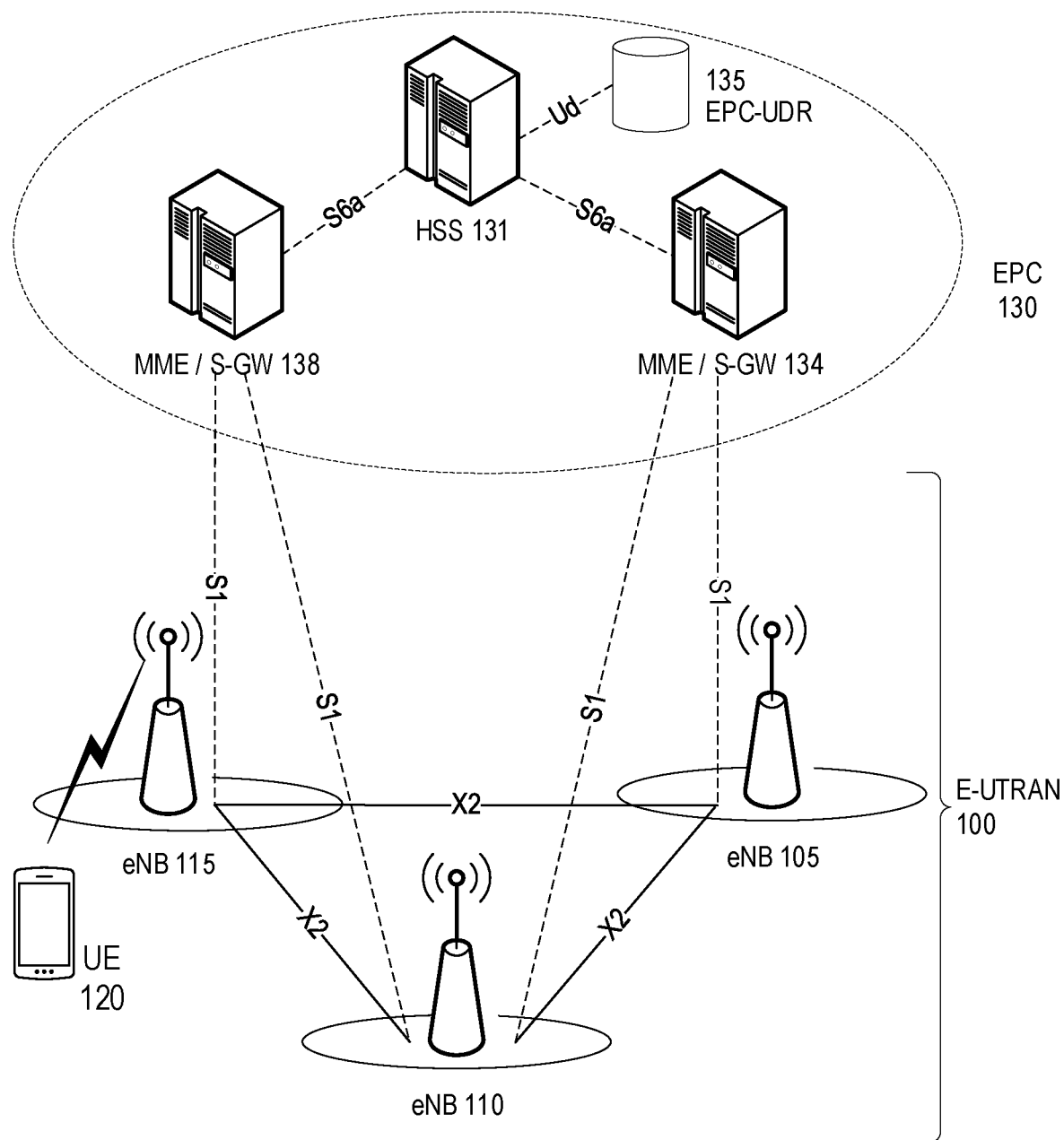
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
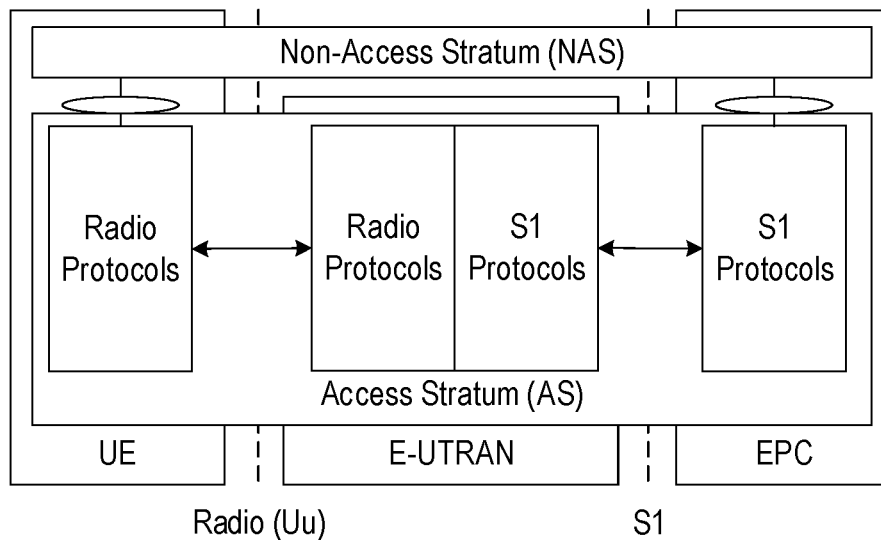
FIG. 2A is a high-level block diagram of an exemplary E-UTRAN architecture in terms of its constituent components, protocols, and interfaces.
Figure 2B:
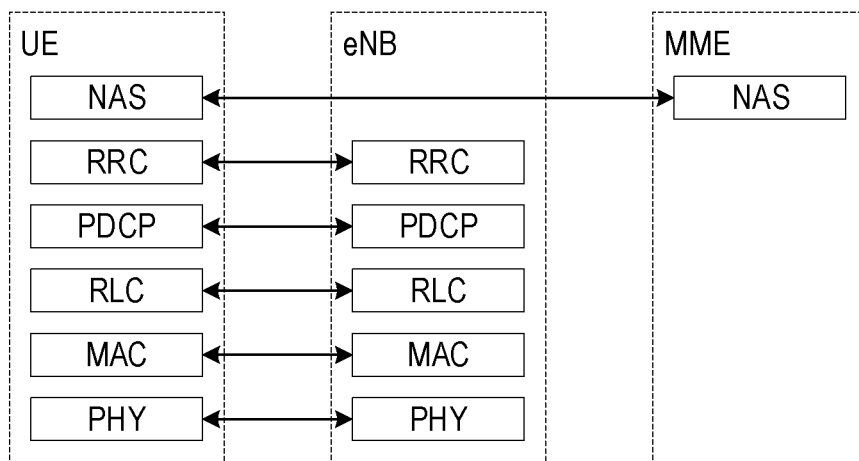
FIG. 2B is a block diagram of exemplary protocol layers of the control-plane portion of the radio (Uu) interface between a user equipment (UE) and the E-UTRAN.
Figure 2C:
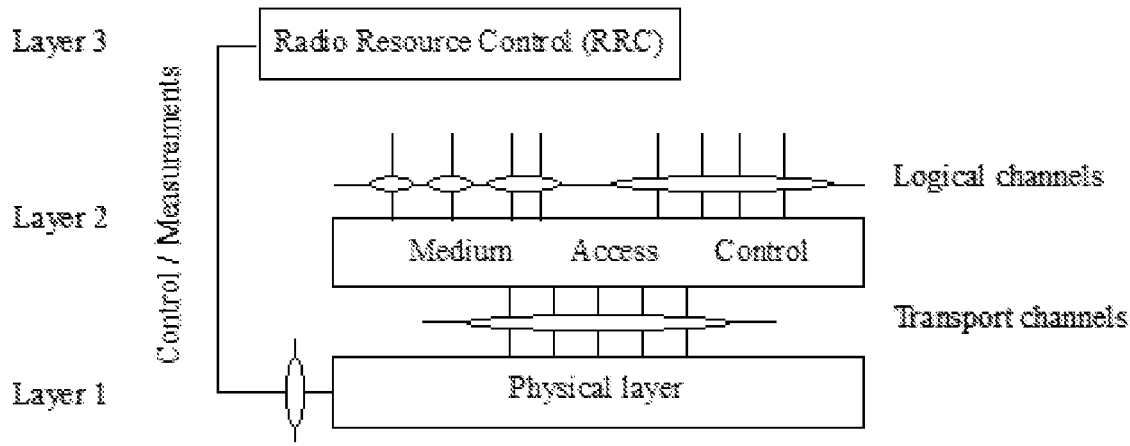
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, various terms discussed below will be used throughout the application.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "radio network node" can refer to any type of network node that can comprise any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH), integrated access backhaul (IAB) node, etc.

In some embodiments, a TRP may be associated with a network node or radio network node. In some embodiments, a multi-TRP scenario may include more than one TRPs associated with one or more network nodes.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, aerial device (e.g., drone), ProSe UE, V2V UE, V2X UE, etc.

Unless otherwise noted, functions described herein as being performed by a network node or a UE can be distributed over a plurality of network nodes or UEs. In other words, it is contemplated that the functions of the network node and UE described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (T0) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, e.g., if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Receiving (or obtaining) control information may include receiving one or more control information messages (e.g., DCI or UCI). It may be considered that receiving control signaling comprises demodulating, decoding, and/or detecting (e.g., blind detection) of one or more messages carried by the control signaling. This can be based on an assumed set of resources, which can be searched and/or monitored for the control information. In such scenarios, both transmitter and receiver of the control information can be aware of the configuration of the resources, and/or may determine the set of resources (e.g., based on the reference size).

Although embodiments may be described below in the context of a downlink (DL) channel (e.g., PDSCH), it should be understood that the principles underlying such embodiments may also be applicable to other channels, e.g., other DL channels and/or certain uplink channels (e.g., PUSCH).

Although the term "cell" is used herein, it should be understood that (particularly with respect to 5G/NR) beams may be used instead of cells and, as such, concepts described herein apply equally to both cells and beams.

Although terminology from one or more specific wireless systems (e.g., LTE and/or NR) may be used herein, this should not be seen as limiting the scope of the disclosure to only those specific wireless system(s). Other wireless systems, including Wide Band Code Division Multiple Access (WCDMA), Worldwide Interoperability for Microwave Access (WiMax), Ultra Mobile Broadband (UMB), and Global System for Mobile Communications (GSM), may also benefit from principles and/or embodiments of the present disclosure.

As briefly mentioned above, in 3GPP NR Rel-16, it has been discussed to support multi-source transmission of PDSCH to UEs, also referred to as non-coherent joint transmission (NC-JT). In this arrangement, frequency-domain resources must be allocated for transmissions from each of the sources (e.g., TRPs). Current solutions for frequency-domain resource allocation are limited to the specific case of each data codeword being transmitted from a single TRP (i.e., one-to-one TRP/codeword mapping). Furthermore, certain signaling used in LTE for such frequency-domain allocations is not available in NR. These problems, issues, and/or drawbacks are discussed in more detail below.

In Rel-15 NR, a UE can be configured with up to four carrier bandwidth parts (BWPs) in the downlink (DL) with a single DL carrier BWP being active at a given time. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

Figure 5:
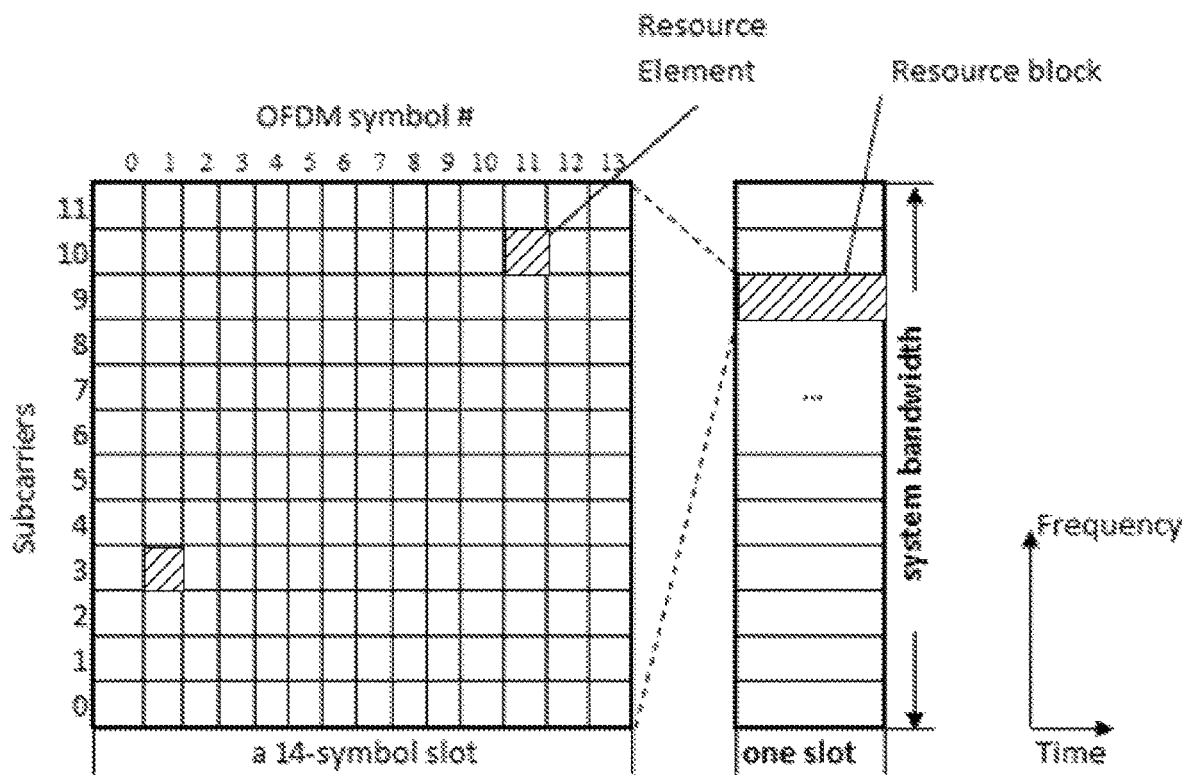
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^\mu)$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The slot length is inversely related to SCS or numerology according to $½^\mu$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu *180$ kHz.

Table 1 below summarizes the supported NR numerologies and associated parameters. Different DL and UL numerologies can be configured by the network.

TABLE 1

| $\mu$ | $\Delta f = 2^\mu \cdot$ 15 [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 6A:
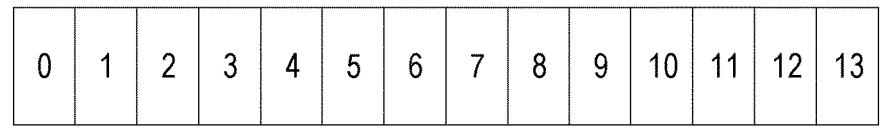
FIGS. 6A-6B shows various exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
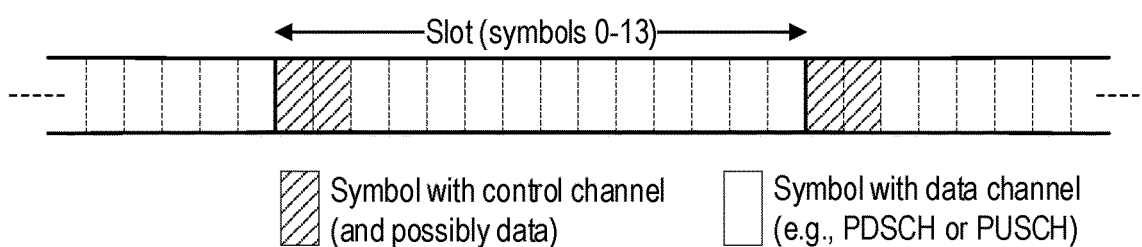

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
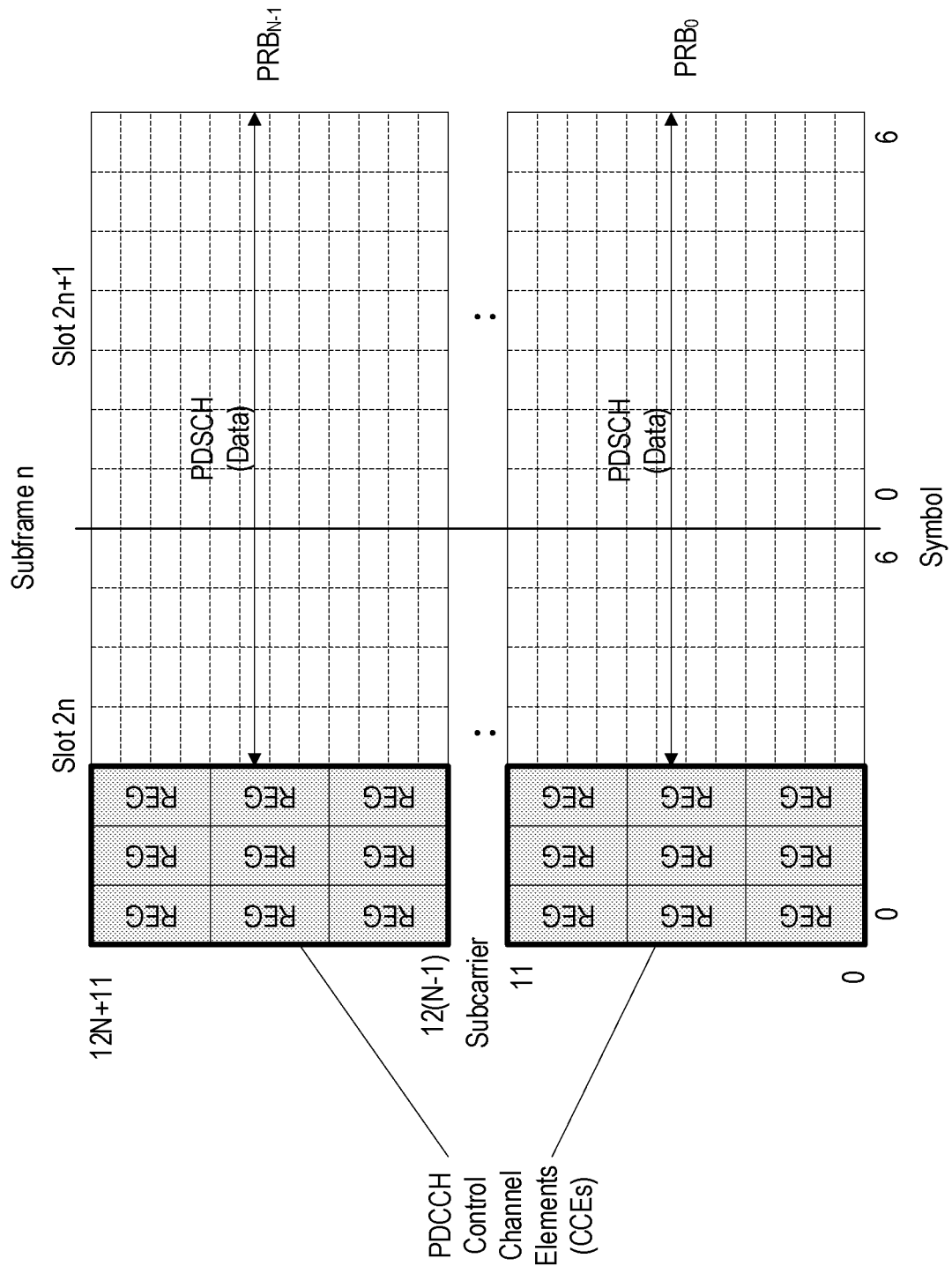
FIG. 4 shows an exemplary manner in which CCEs and REGs can be mapped to a physical resource in LTE.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values κ-4.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH.

NR also supports a similar feature on the UL, referred to as configured grants (CG). In general, CG type 2 is similar to DL semi-persistent scheduling in downlink (e.g., RRC plus DCI) while CG type 1 is controlled by only RRC, including the start and stop of transmissions.

Figure 7:
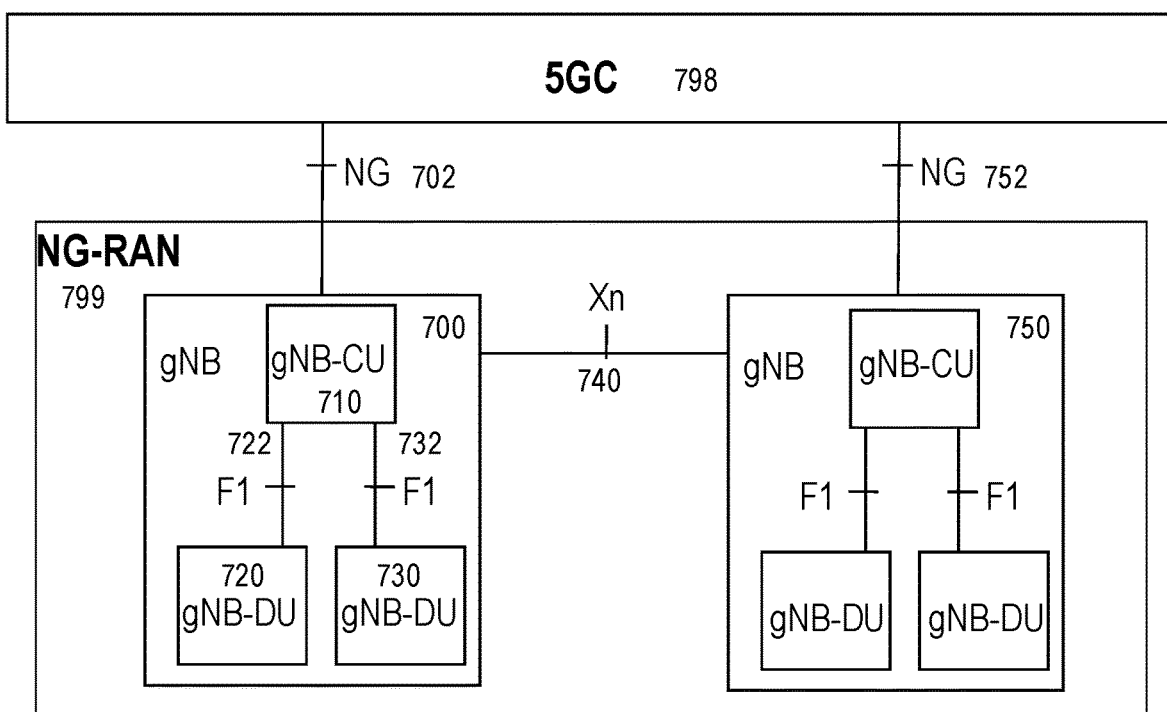
FIG. 7 illustrates a high-level view of a 5G network architecture.

FIG. 7 illustrates a high-level view of the 5G network architecture, consisting of a Next Generation RAN (NG-RAN) 799 and a 5G Core (5GC) 798. NG-RAN 799 can include a set of gNodeB's (gNBs) connected to the 5GC via one or more NG interfaces, such as gNBs 700, 750 connected via interfaces 702, 752, respectively. In addition, the gNBs can be connected to each other via one or more Xn interfaces, such as Xn interface 740 between gNBs 700 and 750. With respect to the NR interface to UEs, each of the gNBs can support frequency division duplexing (FDD), time division duplexing (TDD), or a combination thereof.

The NG RAN logical nodes shown in FIG. 7 (and described in 3GPP TS 38.401 and 3GPP TR 38.801) include a central (or centralized) unit (CU or gNB-CU) and one or more distributed (or decentralized) units (DU or gNB-DU). For example, gNB 700 in FIG. 7 includes gNB-CU 710 and gNB-DUs 720 and 730. CUs (e.g., gNB-CU 710) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
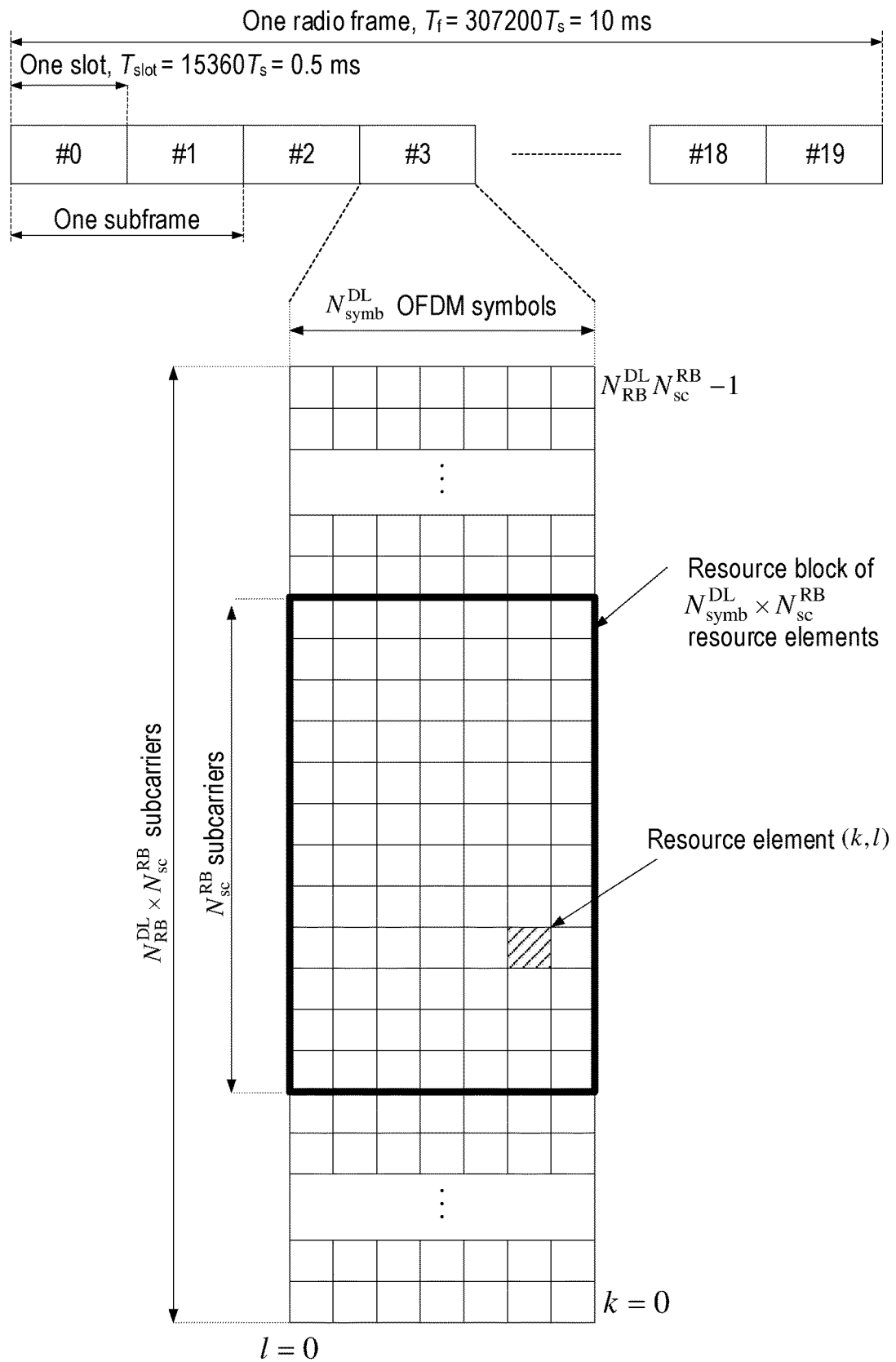
FIGS. 3A and 3B are block diagrams, respectively, of exemplary downlink and uplink LTE radio frame structures used for frequency division duplexing (FDD) operation.
Figure 3B:
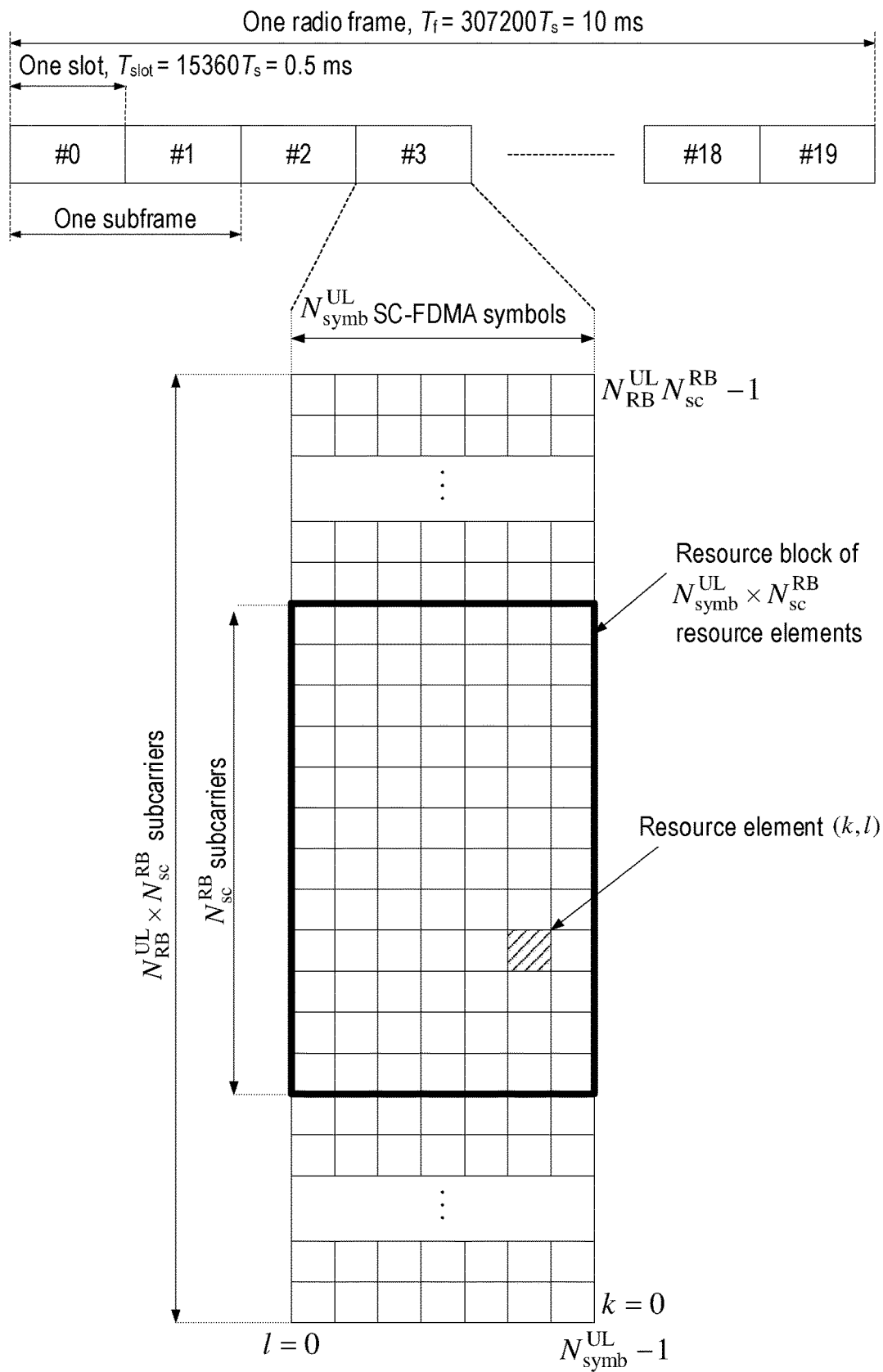

A gNB-CU connects to gNB-DUs over respective F1 logical interfaces, such as interfaces 722 and 732 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Several signals can be transmitted from the same base station (e.g., gNB) antenna from different antenna ports. These signals can have the same large-scale properties, such as in terms of parameters including Doppler shift/spread, average delay spread, and/or average delay. These antenna ports are then said to be "quasi co-located" or "QCL". The network can signal to the UE that two antenna ports are QCL with respect to one or more parameters. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

In LTE Rel-11, a UE configured in transmission mode 10 for a given serving cell can be configured (e.g., by higher layer signaling) with up to four parameter sets usable to decode PDSCH according to a detected PDCCH/EPDCCH with DCI format 2D intended for the UE and the given serving cell. This is because the serving eNB can transmit PDSCH to the UE via different TRPs at different times based on the channel conditions. There can be different reference signals configured for different TRPs. To determine the correct PDSCH RE mapping, the UE uses the parameter set according to the value of the "PDSCH RE Mapping and Quasi-Co-Location indicator" (PQI) field in the detected PDCCH/EPDCCH with DCI format 2D, whose values are illustrated in Table 2 below (extracted from 3GPP TS 36.213) In LTE, this relation is known as "QCL type B."

TABLE 2

| Value of "PDSCH RE Mapping and Quasi-Co-Location Indicator" field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

In LTE Rel-15, a UE configured in transmission mode 10 for a given serving cell can also be indicated with PQI bits for "QCL type C" assumption. The PQI indication table for QCL type C is illustrated in Table 3 below, which is extracted from 3GPP TS 36.213. As shown in this table, each PQI field value can indicate up to two parameter sets. This is because the eNB may transmit PDSCH to the UE via two different TRPs at the same time where each TRP transmits a different codeword (CW) to the UE. As discussed above, this operation is referred to as non-coherent joint transmission (NC-JT).

TABLE 3

| Value of "PDSCH RE Mapping and Quasi-Co-Location Indicator" field | Description |
| --- | --- |
| '00' | Parameter set 1 configured by higher layers for CW 0 and Parameter set 2 configured by higher layers for CW 1 (if any) |
| '01' | Parameter set 3 configured by higher layers for CW 0 and Parameter set 4 configured by higher layers for CW 1 (if any) |
| '10' | Parameter set 5 configured by higher layers for CW 0 and Parameter set 6 configured by higher layers for CW 1 (if any) |
| '11' | Parameter set 7 configured by higher layers for CW 0 and Parameter set 8 configured by higher layers for CW 1 (if any) |

Information about what assumptions can be made regarding QCL is signaled to the UE from the network. In NR, the following four types of QCL relations between a transmitted source RS and transmitted target RS are defined:
- Type A: {Doppler shift, Doppler spread, average delay, delay spread}
- Type B: {Doppler shift, Doppler spread}
- Type C: {average delay, Doppler shift}
- Type D: {Spatial Rx parameter}

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them. When a QCL relation is signaled to a UE, it includes not only information about the particular QCL type (e.g., A, B, C, or D), but also a serving cell index, a BWP index, and a source reference signal identity (CSI-RS, TRS or SSB).

QCL Type D is the most relevant for beam management, but it is also necessary to convey a Type A QCL RS relation to UEs so they can estimate all the relevant large scale parameters. Typically, this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

To introduce dynamics in beam and TRP selection, the UE can be configured through RRC signaling with N Transmission Configuration Indicator (TCI) states, where N is up to 128 in frequency range 2 (FR2) and up to eight in FR1, depending on UE capability. Each configured TCI state contains parameters for the QCL associations between source RS (e.g., CSI-RS or SS/PBCH) and target RS (e.g., PDSCH/PDCCH DMRS antenna ports). TCI states can also be used to convey QCL information for the reception of CSI-RS. Each of the N states in the list of TCI states can be interpreted as a list of N possible beams transmitted from the network, or a list of N possible TRPS used by the network to communicate with the UE.

More specifically, each TCI state can contain an ID along with QCL information for one or two source DL RSs, with each source RS associated with a QCL type, a serving cell index, a BWP index, and a source reference signal identity (CSI-RS, TRS or SSB). For example, two different CSI-RSs {CSI-RS1, CSI-RS2} can be configured in the TCI state as {qcl-Type1, qcl-Type2}={Type A, Type D}. The UE can interpret this TCI state to mean that the UE can derive Doppler shift, Doppler spread, average delay, delay spread from CSI-RS1, and Spatial Rx parameter (e.g., RX beam to use) from CSI-RS2. In case QCL Type D is not applicable (e.g., low- or mid-band operation), then a TCI state contains only a single source RS. Unless specifically noted, however, references to "pairs" of source RS includes the case of a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE can be configured with four active TCI states from a list of 64 total configured TCI states. Hence, the other 60 configured TCI states are inactive and the UE need not be prepared to estimate large scale parameters for those. On the other hand, the UE continuously tracks and updates the large-scale parameters for the four active TCI states by performing measurements and analysis of the source RSs indicated for each of those four TCI states. Each DCI used for PDSCH scheduling includes a pointer to one active TCI for the scheduled UE. Based on this pointer, the UE knows which large scale parameter estimate to use when performing PDSCH DMRS channel estimation and PDSCH demodulation.

Demodulation reference signals (DM-RS) facilitate the UE's coherent demodulation of physical layer data channels (e.g., PDSCH) and PDCCH. Each DM-RS is associated with one of these physical-layer channels and, as such, is confined to resource blocks carrying the associated physical layer channel. Each DM-RS is mapped on allocated REs of the time-frequency grid such that the receiver can efficiently handle time/frequency-selective fading radio channels.

The mapping of DM-RS to REs is configurable in both frequency and time domains, with two mapping types in the frequency domain (configuration type 1 or type 2) and two mapping types in the time domain (mapping type A or type B) defining the position of the first DM-RS within a transmission interval. The DM-RS mapping in time domain can also be single-symbol-based or double-symbol-based (i.e., pair of adjacent symbols). Furthermore, a UE can be configured with one, two, three or four single-symbol DM-RS and one or two double-symbol DM-RS. In scenarios with low Doppler, it may be sufficient to configure front-loaded DM-RS only (i.e., one single- or double-symbol DM-RS), while additional DM-RS will be required in scenarios with high Doppler.

Figure 8A:
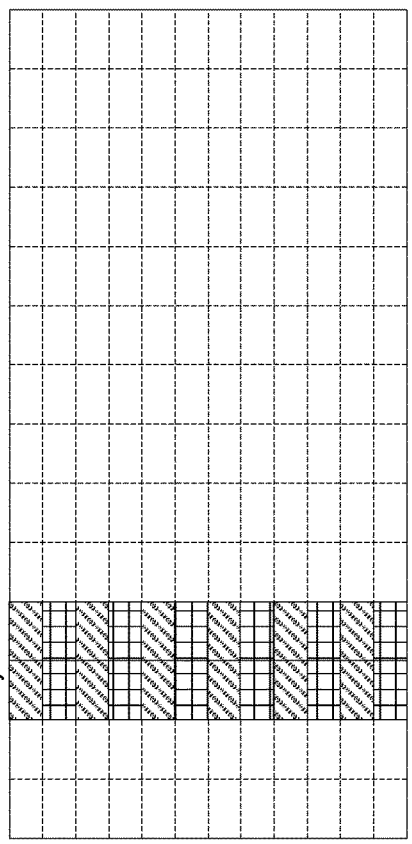
FIGS. 8A-8D, shows four exemplary mappings of front-loaded demodulation reference signals (DM-RS).
Figure 8B:
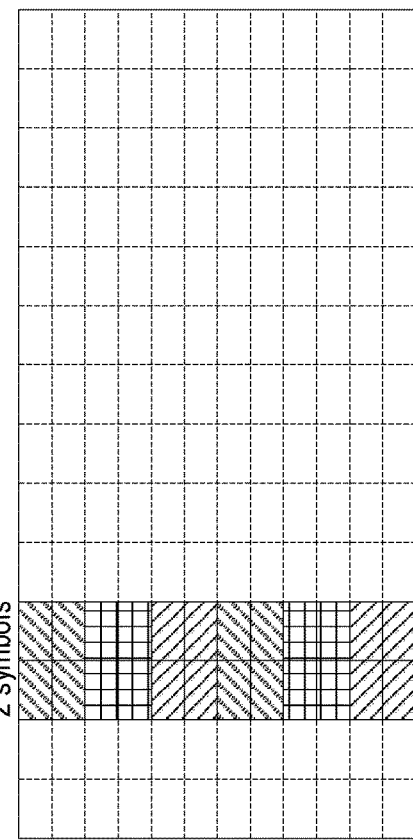
Figure 8C:
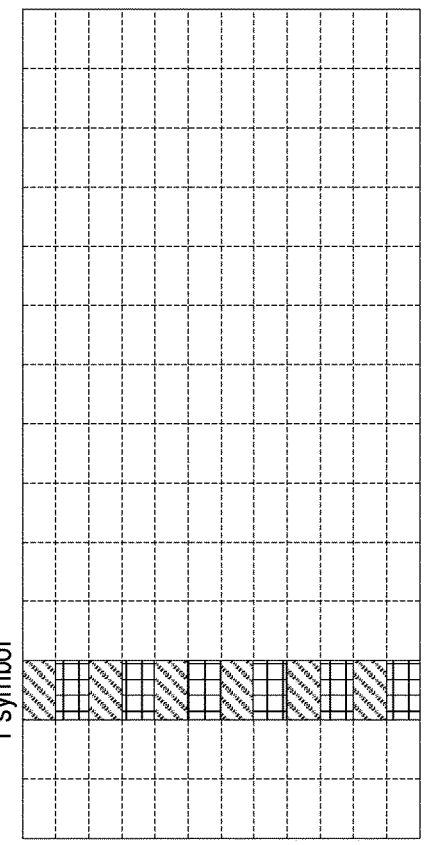
Figure 8D:
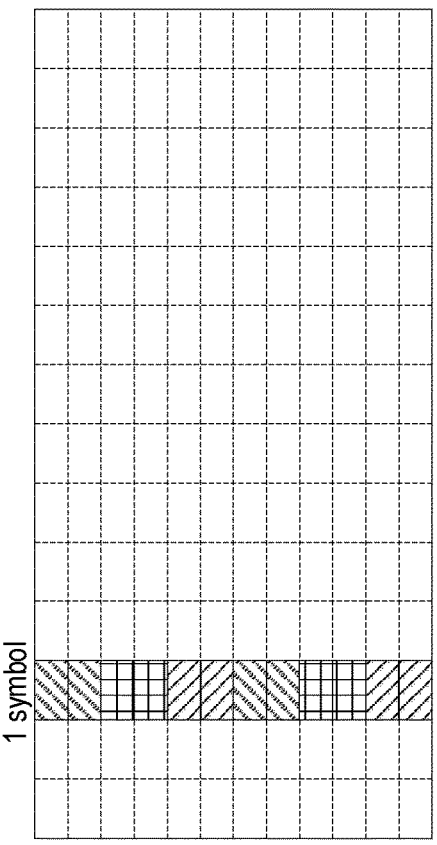

FIG. 8, which includes FIGS. 8A-8D, shows four exemplary mappings of front-loaded DM-RS with type-A time-domain mapping, in which the first DM-RS is in the third symbol of 14-symbol slot. More specifically, FIGS. 8A-8B show mappings for configuration type 1 for single-symbol and double-symbol DM-RS, respectively. Likewise, FIGS. 8C-8D show mappings for configuration type 2 for single-symbol and double-symbol DM-RS, respectively. As illustrated in FIG. 8, type 1 and type 2 mapping differ with respect to both the mapping structure and the number of supported DM-RS CDM groups. As illustrated by the different shadings of the DM-RS REs, type 1 supports two CDM groups (e.g., $\lambda=0,1$) and type 2 supports three CDM groups (e.g., $\lambda=0, 1, 2$).

The mapping structure of type 1 is sometimes referred to as a 2-comb structure with two CDM groups defined, in frequency domain, by the set of subcarriers $\{0, 2, 4, \ldots\}$ and $\{1, 3, 5, \ldots\}$. Since it facilitates low peak-to-average power ratio (PAPR) transmissions, the comb mapping structure is used in conjunction with DFT-S-OFDM in the NR UL. In contrast, both type 1 and type 2 mapping are supported for CP-OFDM operation (e.g., in UL and DL).

A DM-RS antenna port is mapped to the REs within one CDM group only. For single-symbol DM-RS, two antenna ports can be mapped to each CDM group, while for double-symbol DM-RS, four antenna ports can be mapped to each CDM group. Hence, the maximum number of DM-RS ports either four or eight for type 1, and either six or twelve for type 2. A length-two orthogonal cover code (OCC) ([+1, +1], [+1, −1]) is used to separate antenna ports mapped on same REs within a CDM group. The OCC is applied in frequency domain as well as in time domain when double-symbol DM-RS is configured.

In NR Rel-15, the mapping of a PDSCH DM-RS sequence $r(m)$, $m=0, 1, \ldots$ on antenna port $p_j$ and subcarrier k in OFDM symbol l for the numerology index $\mu$ is specified in 3GPP TS 38.211 according to:

$$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $$r_\lambda^{(p_j)}(2n + k') = w_f(k')w_t(l')r(2n + k')$$

represents the reference signal mapped on port $p_j$ in CDM group $\lambda$ after applying OCC in frequency domain, $w_f(k')$, and time domain, $w_t(l')$. Tables 4-5 below show the PDSCH DM-RS mapping parameters for configuration type 1 and type 2, respectively.

TABLE 4

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 5

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

DCI also includes a bit field that indicates which antenna ports (i.e., the number of data layers) are scheduled. For example, if DMRS port 1000 is indicated by the DCI, then the PDSCH is a single layer transmission and the UE will use the DMRS defined by port 1000 to demodulate the PDSCH. The DCI value also indicates the number of CDM groups without data, which means that if 1 is indicated, the other CDM group contains data for the UE (PDSCH case), and if 2 is indicated, both CDM groups may contains DMRS ports and no data is mapped to the OFDM symbol containing the DMRS. Table 6 below shows bit-field values and corresponding configurations for DM-RS Type 1 with a single, front-loaded DM-RS (maxlength=1). Note that the DMRS port(s) values shown in Table 6 are modulo-1000 versions of the p values given in Table 4.

TABLE 6

| DCI value | No. of DMRS CDM group(s) without data | DMRS port(s) |
|---|---|---|
| Codeword 0 enabled, Codeword 1 disabled | | |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

For DMRS Type 1, ports 1000, 1001, 1004, and 1005 are in CDM group $\lambda=0$ and ports 1002, 1003, 1006, and 1007 are in CDM group $\lambda=1$ (also illustrated in Table 4). Table 7 shows a corresponding exemplary configuration for DMRS Type 2 (maxlength=1). For DMRS Type 2, ports 1000, 1001, 1006, and 1007 are in CDM group $\lambda=0$; ports 1002, 1003, 1008, and 1009 are in CDM group $\lambda=1$; and ports 1004, 1005, 1010, and 1011 are in CDM group $\lambda=2$ (also illustrated in Table 5). Note that the DMRS port(s) values shown in Table 5 are modulo-1000 versions of the p values given in Table 3. Corresponding tables with exemplary configurations for DMRS Types 1 and 2 with maxlength=2 can also be defined, but are omitted herein for the sake of brevity.

TABLE 7

| DCI Value | No. of DMRS CDM group(s) without data | DMRS port(s) |
|---|---|---|
| Codeword 0 enabled, Codeword 1 disabled | | |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24-31 | Reserved | Reserved |
| Codeword 0 enabled, Codeword 1 enabled | | |
| 0 | 3 | 0-4 |
| 1 | 3 | 0-5 |
| 2-31 | reserved | reserved |

Currently, the 3GPP NR specifications include a restriction that the UE may assume that the PDSCH DM-RS within the same CDM group are QCL with respect to Doppler shift, Doppler spread, average delay, delay spread, and spatial Rx.

In cases where a first UE is not scheduled on all DMRS ports within a CDM group, another UE can be simultaneously scheduled for the remaining ports of that CDM group. The first UE can then estimate the channel for that other UE, which is seen by the first UE as an interfering signal. That facilitates coherent interference suppression by the first UE.

After the NR PHY receives a transport block from the MAC layer, it converts the transport block into a codeword prior to transmission. At a high level, this process involves applying a checksum, segmenting the transport block into code blocks, applying error protection (e.g., turbo coding) to each code block, then reassembling the code blocks into a codeword (CW). The NR PHY then converts the bits comprising the CW into modulation symbols (e.g., according to the modulation scheme currently in use), and then assigns the modulation symbols to one or more MIMO layers for spatial multiplexing. In some cases, the NR PHY can receive two transport blocks from the MAC for transmission in a single transmission interval and, accordingly, can produce one CW for each received transport block.

In NR, one CW can be assigned to up to four MIMO layers and two CWs are assigned to more than four layers. 3GPP TS 38.211 specifies how complex-valued modulation symbols $d^{(q)}(0), \ldots, d^{(q)}(M_{symb}^{(q)}-1)$ of codeword q can be mapped onto layers $x(i)=[x^{(0)}(i) \ldots x^{(v-1)}(i)]^T$, $i=0, 1, \ldots, M_{symb}^{layer}-1$, where is the number of layers, $M_{symb}^{layer}$ is the number of modulation symbols per layer, and $M_{symb}^{(q)}$ is the number of modulation symbols per CW. Table 8 below (corresponding to 38.211 Table 7.3.1.3-1) shows an exemplary CW-to-layer mapping for NR spatial multiplexing. Furthermore, the blocks of vectors) $[x^{(0)}(i) \ldots x^{(v-1)}(i)]^T$, $i=0, 1, \ldots, M_{symb}^{layer}-1$ shown in Table 8 can be mapped to antenna ports according to the relation:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{ap}-1$, $M_{symb}^{ap}=M_{symb}^{layer}$. The set of antenna ports $\{p_0 \ldots, p_{v-1}\}$ can be determined according to Tables 6-7 above for maxlength=1, and similar tables corresponding to maxlength=2.

TABLE 8

| Layers | CWs | Codeword-to-layer mapping, i = 0, 1, . . . , $M_{symb}^{layer}$ − 1 | | |
|---|---|---|---|---|
| 1 | 1 | $x^{(0)}(i) = d^{(0)}(i)$ | | $M_{symb}^{layer} = M_{symb}^{(0)}$ |
| 2 | 1 | $x^{(0)}(i) = d^{(0)}(2i)$ | | $M_{symb}^{layer} = M_{symb}^{(0)}/2$ |
| | | $x^{(1)}(i) = d^{(0)}(2i + 1)$ | | |
| 3 | 1 | $x^{(0)}(i) = d^{(0)}(3i)$ | | $M_{symb}^{layer} = M_{symb}^{(0)}/3$ |
| | | $x^{(1)}(i) = d^{(0)}(3i + 1)$ | | |
| | | $x^{(2)}(i) = d^{(0)}(3i + 2)$ | | |
| 4 | 1 | $x^{(0)}(i) = d^{(0)}(4i)$ | | $M_{symb}^{layer} = M_{symb}^{(0)}/4$ |
| | | $x^{(1)}(i) = d^{(0)}(4i + 1)$ | | |
| | | $x^{(2)}(i) = d^{(0)}(4i + 2)$ | | |
| | | $x^{(3)}(i) = d^{(0)}(4i + 3)$ | | |
| 5 | 2 | $x^{(0)}(i) = d^{(0)}(2i)$ | $x^{(2)}(i) = d^{(1)}(3i)$ | $M_{symb}^{layer} = M_{symb}^{(0)}/2 = M_{symb}^{(1)}/3$ |
| | | $x^{(1)}(i) = d^{(0)}(2i + 1)$ | $x^{(3)}(i) = d^{(1)}(3i + 1)$ | |
| | | | $x^{(4)}(i) = d^{(1)}(3i + 2)$ | |
| 6 | 2 | $x^{(0)}(i) = d^{(0)}(3i)$ | $x^{(3)}(i) = d^{(1)}(3i)$ | $M_{symb}^{layer} = M_{symb}^{(0)}/3 = M_{symb}^{(1)}/3$ |
| | | $x^{(1)}(i) = d^{(0)}(3i + 1)$ | $x^{(4)}(i) = d^{(1)}(3i + 1)$ | |
| | | $x^{(2)}(i) = d^{(0)}(3i + 2)$ | $x^{(5)}(i) = d^{(1)}(3i + 2)$ | |
| 7 | 2 | $x^{(0)}(i) = d^{(0)}(3i)$ | $x^{(3)}(i) = d^{(1)}(4i)$ | $M_{symb}^{layer} = M_{symb}^{(0)}/3 = M_{symb}^{(1)}/4$ |
| | | $x^{(1)}(i) = d^{(0)}(3i + 1)$ | $x^{(4)}(i) = d^{(1)}(4i + 1)$ | |
| | | $x^{(2)}(i) = d^{(0)}(3i + 2)$ | $x^{(5)}(i) = d^{(1)}(4i + 2)$ | |
| | | | $x^{(6)}(i) = d^{(1)}(4i + 3)$ | |
| 8 | 2 | $x^{(0)}(i) = d^{(0)}(4i)$ | $x^{(4)}(i) = d^{(1)}(4i)$ | $M_{symb}^{layer} = M_{symb}^{(0)}/4 = M_{symb}^{(1)}/4$ |
| | | $x^{(1)}(i) = d^{(0)}(4i + 1)$ | $x^{(5)}(i) = d^{(1)}(4i + 1)$ | |
| | | $x^{(2)}(i) = d^{(0)}(4i + 2)$ | $x^{(6)}(i) = d^{(1)}(4i + 2)$ | |
| | | $x^{(3)}(i) = d^{(0)}(4i + 3)$ | $x^{(7)}(i) = d^{(1)}(4i + 3)$ | |

Frequency-domain resources also must be allocated for transmission of the resulting layers. Rel-15 NR supports two types of downlink frequency domain resource allocations, referred to as "type 0" and "type 1." In downlink resource allocation type 0, a bitmap in the "Frequency domain resource assignment" (or FDRA for short) DCI field indicates the resource block groups (RBGs) that are allocated to the scheduled UE. An RBG consists of a set of consecutive virtual resource blocks (VRBs), and the RBG size can be configured by higher layers. As shown in exemplary Table 9 below, two configurations are possible for the RBG size, depending on the BWP size.

TABLE 9

| BWP Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

For resource allocation type 0, the number of bits included in the FDRA field is $N_{RBG}$, wherein $N_{RBG}$ is the number of RBGs in the bandwidth part the UE is being scheduled on. The number of RBGs in the $i^{th}$ bandwidth part with size $N_{BWP,i}^{size}$ is defined as:

$$N_{RBG}\lceil(N_{BWP,i}^{size}+(N_{BWP,i}^{start} \bmod P))/P\rceil.$$

In downlink resource allocation type 1, the FDRA DCI field indicates a set of contiguously allocated non-interleaved or interleaved VRBs within the active BWP. The FDRA field includes the resource indication value (RIV) representing the starting VRB ($RB_{start}$), with the length of the contiguously allocated resource blocks denoted by $L_{RBs}$. The number of bits in FDRA field is $\lceil\log_2(N_{RB}^{DL,BWP}(N_{RB}^{DL,BWP}+1)/2)\rceil$ wherein $N_{RB}^{DL,BWP}$ is the size of the active bandwidth part. Downlink Resource allocation type 1 is used in both DCI formats 1_0 and 1_1.

In NR Rel-15, it is possible for both resource allocation type 0 and type 1 to be configured. In this case, the number of bits in the FDRA DCI field is given max ($\lceil \log_2 (N_{RB}^{DL,BWP}(N_{RB}^{DL,BWP}+1)/2) \rceil$, $N_{RBG}$)+1. Here, the most significant bit (MSB) indicates the resource allocation type used. More specifically, an MSB value of "1" indicates that resource allocation type 1 is used while an MSB value of "0" indicates that resource allocation type 0 is used.

As briefly mentioned above, in 3GPP NR Rel-16, it has been discussed to support multi-source transmission of PDSCH to UEs (also referred to as NC-JT) in which multiple MIMO layers (e.g., carrying mapped CWs) can be transmitted over multiple TRPs in various ways. For example, when the UE has four receive antennas while each of the TRPs has only two transmit antennas, the UE can support up to four MIMO layers. In this case, by transmitting data over two TRPs to the UE, the peak data rate to the UE can be increased as up to four aggregated layers from the two TRPs can be used. This is beneficial when the traffic load and/or resource utilization is low in each TRP, since resources in two TRPs can be used for scheduling one UE.

NC-JT can also be beneficial when the UE is in line of sight (LOS) of the multiple TRPs and the rank per TRP (i.e., the maximum number of layers that the UE can receive from one TRP) is less than the number of transmit antennas at each TRP (i.e., the UE can receive more layers than one TRP can deliver). NC-JT can also be beneficial when the maximum number of layers that a TRP can transmit is lower than the number of layers the UE can receive. In such case, utilizing more than one TRP can increase the spectral efficiency of the communication to the UE.

Figure 9A:
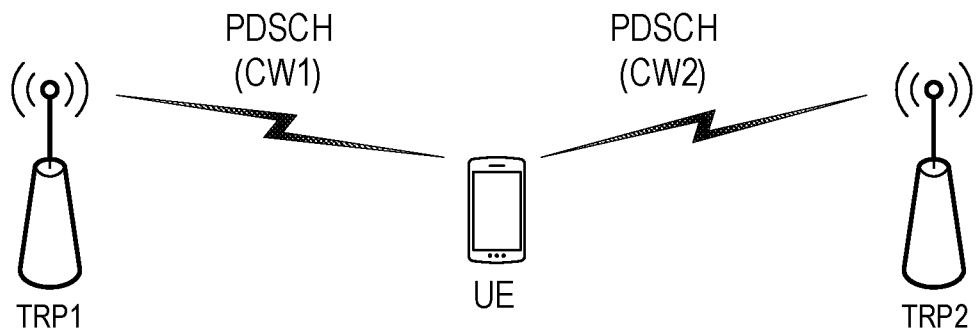
FIGS. 9A-C, shows three exemplary transmission configurations in which a PDSCH is sent to a UE from two or more transmission sources (e.g., TRPs), according to various exemplary embodiments of the present disclosure.

FIG. 9A shows an exemplary transmission configuration in which a PDSCH is sent to a UE from two TRPs, each carrying one CW. For example, when the UE has four receive antennas while each of the TRPs has only two transmit antennas, the UE can support up to four MIMO layers. In this case, by transmitting data over two TRPs to the UE, the peak data rate to the UE can be increased since up to four aggregated layers from the two TRPs can be used. This is beneficial when the traffic load and/or resource utilization is low in each TRP, thereby facilitating scheduling resources in two TRPs for one UE. This technique can also be beneficial in the case where the UE is in line of sight (LOS) of both the TRPs and the rank per TRP (i.e., the maximum number of layers that the UE can receive from one TRP) is less than the transmit antennas available at each TRP, such that the UE can receive more layers than the single TRP can deliver. This technique can also be beneficial when the maximum number of layers a TRP can transmit is lower than the number of layers the UE can receive. In such case, utilizing more than one TRP can increase the spectral efficiency of the communication to the UE.

This type of NC-JT is also supported in LTE with two TRPs. For CSI feedback, a UE is configured with a CSI process having two NZP CSI-RS resources (i.e., one for each TRP) and one interference measurement resource. For UE complexity reasons, this feedback mode is limited to at most eight CSI-RS ports per CSI-RS resource. However, each TRP may have more than eight transmission chains, in which case they need to be virtualized down to eight ports. With two CWs, scheduled using a single PDSCH or two PDSCHs, different modulation and coding schemes (MCS) can be used for the two TRPs. An advanced receiver (e.g., with code level interference cancellation (CWIC)) can also be used at the UE. Furthermore, when one CW is received with error, only that CW needs to be re-transmitted.

Figure 9B:
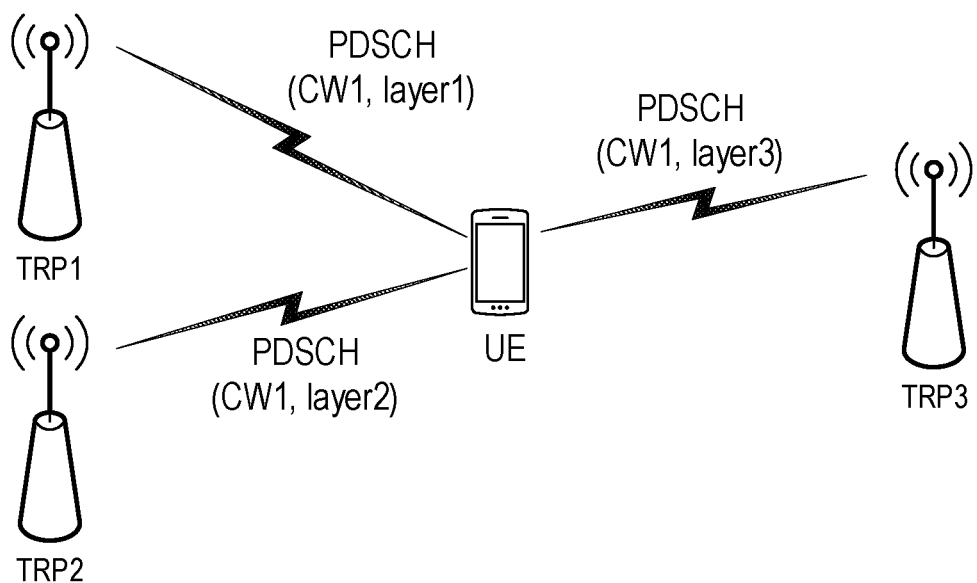

FIG. 9B shows another exemplary transmission configuration in which a PDSCH is sent to a UE from three TRPs, each carrying a different layer of a single PDSCH CW. This configuration facilitates data transmission over more than two TRPs since there is no one-to-one mapping between CWs and TRPs, but can be less flexible than the exemplary configuration shown in FIG. 9A when it comes to retransmission and link adaptation.

When it comes to CSI reporting with multiple TRPs, the concept of "transmission hypothesis" becomes important. Put a different way, what kind of transmission should the CSI report reflect? In DPS with two TRPs, there are two transmission hypotheses, but with NC-JT included, and also considering multiple interference hypotheses, the number of transmission hypotheses can grow quickly with the number of considered TRPs. To address this issue in NR, a gNB may configure a UE with multiple CSI reporting settings, where each setting is targeting one transmission hypothesis (e.g., one hypothesis for DPS, another for NC-JT). The UE then provides two CSI reports, one for each hypothesis. The gNB can then decide whether to use DPS or NC-JT for transmission to the UE based on other information available at the gNB.

Figure 9C:
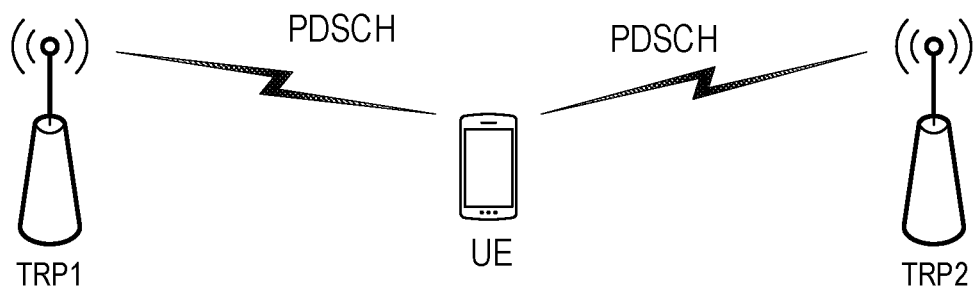

In addition to use multi-TRP transmission for improved data throughput and increased spectral efficiency, multi-TRP transmission can also provide increased reliability of data transmission by a form of "multi-TRP diversity." This can be beneficial and/or important in some mission critical applications such as autonomous vehicles, industrial control, factory automation, etc. These applications are expected users of the ultra-reliable, low-latency communication (URLLC) service provided by NR networks, briefly discussed above. FIG. 9C shows another exemplary transmission configuration in which a PDSCH is sent to a UE from two TRPs, with the two PDSCH carry the same data block encoded with the same or different redundancy version (RV). The UE can perform soft combining of data received from the two PDSCH, thereby increasing reception reliability such that very few retransmissions are required.

Either the same or different time/frequency resources may be used for the transmitted PDSCH in different TRPs. When the same time and frequency resource are used in different TRPs, different MIMO layers must be used for the respective PDSCH transmissions, a UE MIMO receiver to separate the received layers for PDSCH decoding. In this case, each layer/PDSCH uses reference signals that are orthogonal to reference signals used by other layers/PDSCH in the same time/frequency resource. Alternately, the PDSCH can be transmitted using different time and frequency resources in the multiple TRPs. The codeword carried by the PDSCHs from different TRPs may have the same or different RV and soft combining is performed at the UE. Chase combining (CC) can be performed when the same RV is used, while Incremental redundancy (IR) based soft combining can be done when different RVs are used.

As another alternative, the identical PDSCH information (e.g., same RV) can be transmitted by multiple TRPs using the same time/frequency resource and the same DMRS port, such that the composite signal is received by the UE in a single frequency network (SFN) fashion. Since the UE effectively receives a single layer, the existence of multiple TRPs are "hidden" from the UE. This alternative can be beneficial in small deployments (e.g., indoor) at low-to-medium carrier frequencies.

To support multi-TRP transmission in NR, it has this been discussed to extend the TCI state from the Rel-15 pair of two source RS with QCL type 1 and type 2 (e.g., TCI state={qcl-Type1,qcl-Type2}), to an extended TCI state with two pairs A and B or even three pairs A, B, and C. These options can be expressed as:

TCI state={{qcl-Type1,qcl-Type2}$_A$,{qcl-Type1,qcl-Type2}$_B$}, and

TCI state={{qcl-Type1,qcl-Type2}$_A$,{qcl-Type1,qcl-Type2}$_B$,{qcl-Type1,qcl-Type2}$_C$}.

In the above, A, B, and C can represent three different TRPs, three different antenna panels at one gNB, or three different beams in case of FR2 operation (also referred to as "millimeter wave" or "mmW" for short).

For NC-JT transmission, frequency domain resources must be allocated for transmissions from each of the source (e.g., TRPs). Current solutions for frequency-domain resource allocation are limited to the specific case of each data codeword being transmitted from a single TRP (i.e., one-to-one TRP/codeword mapping). Furthermore, certain signaling used in LTE for such frequency-domain allocations is not available in NR.

Three different frequency-domain resource allocation techniques for multi-TRP (e.g., NC-JT) are being discussed for Rel-16. In fully-overlapping resource allocation, the downlink transmissions from multiple TRPs or panels are allocated the same frequency domain resources. The existing downlink resource allocation types 0 and 1 in NR can be readily used for this type of resource allocation. However, the transmissions from the multiple TPRs may interfere with each other in fully-overlapping resource allocation.

In non-overlapping resource allocation, the downlink transmissions from multiple TRPs or panels are allocated non-overlapping frequency domain resources. The existing downlink resource allocation types 0 and 1 must be modified to support this type of resource allocation.

Figure 10A:
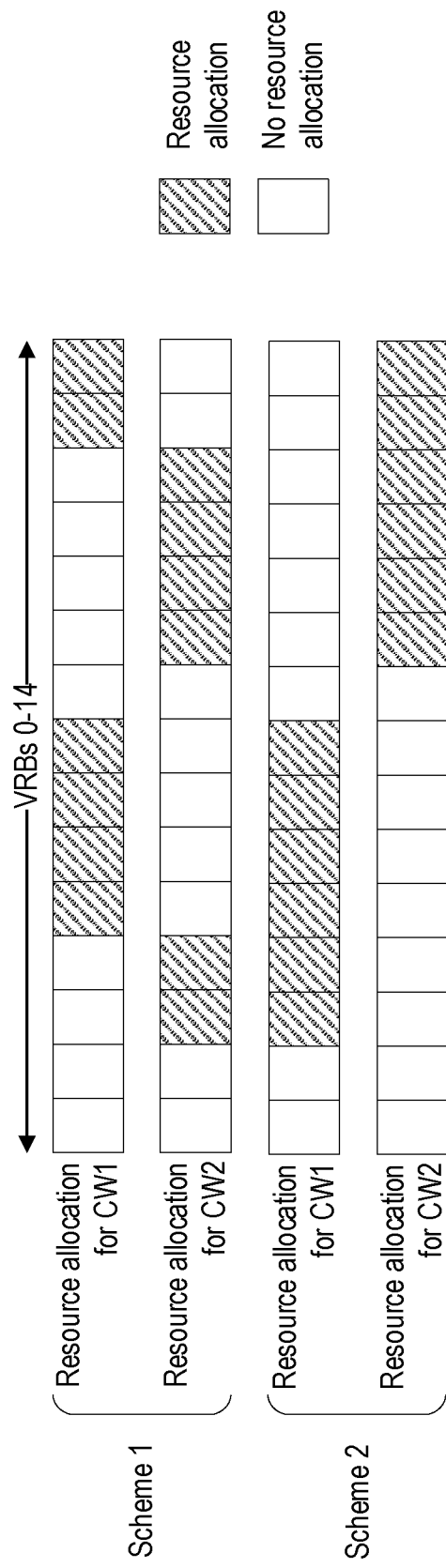
FIGS. 10A-B, shows two exemplary non-overlapping frequency-domain resource allocation techniques for LTE.
Figure 10B:
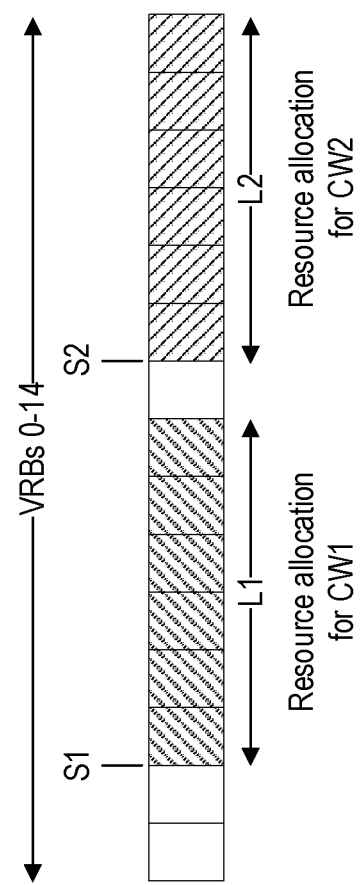

FIGS. 10A-B show two exemplary non-overlapping frequency-domain resource allocation techniques for LTE. In the technique illustrated by FIG. 10A, non-overlapping VRBs are allocated to two different codewords being transmitted from two LTE TRPs. FIG. 10A shows two examples of allocating non-overlapping VRBs to two codewords. In Scheme 1, there are two disjoint contiguous VRBs allocated to each CW transmitted from each TRP. In Scheme 2, there is a single contiguous VRB allocated to each CW transmitted from each TR.

These non-overlapping frequency-domain allocations can be indicated to the UE in various ways. As one example, two independent fields within a single DCI can be used to allocate frequency domain allocation for CWs 1 and 2. In this approach, a starting VRB and a number of contiguously allocated resource blocks for CW 1 are jointly encoded in the DCI field corresponding to CW 1, whereas the corresponding parameters are jointly encoded in DCI field corresponding to CW 2. As another example, a single field within DCI can be used to allocate resources for both CWs 1 and 2. FIG. 10B shows an exemplary non-overlapping configuration with contiguous frequency-domain allocations for CWs 1 and 2. In this configuration, the starting VRBs S1/S2 numbers of contiguously allocated resource blocks L1/L2 correspond to CWs 1 and 2, respectively. The parameters S1, S2, L1, and L2 can be jointly encoded and indicated in the single DCI field.

As another alternative, non-overlapping frequency domain resource allocation can be supported by increasing the RBG size. For instance, the RBG size can be doubled compared to the RBG size of the fully overlapped frequency domain resource allocation. In this alternative, if the frequency domain resource allocation field contains ⌈N/P⌉ bits, then these bits are divided into two parts. The first part containing ⌈N/2P⌉ bits signals the resource allocation for the first codeword from the first TRP, and the second part containing the remaining ⌈N/P⌉−⌈N/2P⌉ bits can be used to signal the resource allocation for the second codeword from the second TRP.

Finally, partially overlapping resource allocation is intermediate between the fully overlapping and non-overlapping resource allocation types. In this approach, some of the allocated frequency domain resources for downlink transmissions from multiple TRPs or panels overlap, while other allocated resources do not overlap. In a general sense, fully overlapping and non-overlapping resource allocations can be considered subsets of partially overlapping resource allocation, the most general case when the multiple TRPs have independent resource allocation. Even so, the solutions discussed above are based on the UE supporting either fully-overlapping or non-overlapping at any given time, but not both at the same time (i.e., partially overlapping). For example, the UE can be configured (e.g., by RRC, PQI, etc.) to interpret relevant DCI fields as either an overlapping or a non-overlapping allocation.

Furthermore, the LTE-centric solutions for multiple frequency domain resource allocation in a single DCI, discussed above, are specific to NC-JT transmission with a one-to-one mapping between CW and transmission source (e.g., TRP). These solutions are not applicable to the more flexible NR NC-JT, where multiple TRPs can transmit different layers of a single CW. Furthermore, these LTE-centric solutions rely on the LTE PQI signaling to distinguish the type of resource allocation (e.g., single vs. double) conveyed by a single DCI field. NR does not use the PQI framework for QCL indication and instead uses the TCI framework, discussed in more detail above.

Exemplary embodiments of the present disclosure can address these and other issues, problems, and/or difficulties by providing novel techniques for indicating the contents of a DCI field (e.g., in a DL scheduling grant) pertaining to frequency-domain resource allocations. For example, these embodiments provide various novel and efficient techniques to indicate the number of frequency-domain resource allocations contained in the DCI field. In addition, these embodiments are fully compatible with the TCI framework being used in NR.

In addition to this compatibility, exemplary embodiments provide various specific advantages and/or improvements to conventional techniques for frequency-domain resource allocation discussed above. For example, embodiments can facilitate adapting the number of frequency domain resource allocations in a single DCI field to different types of traffic profiles and/or services (e.g., for URLLC traffic vs eMBB traffic).

Additionally, embodiments can facilitate dynamic switching between single frequency domain resource allocation and multiple frequency domain resource allocation for multi-TRP/multi-panel transmission, even within a single 'Frequency domain resource assignment' DCI field. This promotes flexibility without introducing a further DCI field for frequency domain resource allocation, thereby eliminating the need to increase DCI size and, consequently, the amount of (e)PDCCH resources required to transmit the DCI.

As an additional example, embodiments facilitate transmission of different RVs of the same data packet from multiple TRPs in overlapping OFDM symbols but in non-overlapping frequency domain resource allocations, which can be beneficial for "multi-TRP diversity" in URLLC-type applications (e.g., to facilitate increased reliability).

At a high level, particular embodiments can be summarized as follows. In some embodiments, the number of frequency domain resource allocations in a particular DCI field can be determined based on a further DCI field that indicates a profile of the scheduled DL traffic, e.g., whether the traffic is URLLC or eMBB. In other embodiments, the number of frequency domain resource allocations can be determined based on a further DCI field indicating a number of TCI states and/or a number of QCL source RS pairs. In other embodiments, the number of frequency domain resource allocations can be determined based on the value of an RV field in the DCI, where each RV value represents a different repetition from a different transmission source (e.g., TRP, panel, etc.). In other embodiments, the number of frequency domain resource allocations can be determined based on the sets of DMRS ports indicated by an antenna port field in the DCI.

In yet other embodiments, the number of frequency domain resource allocations in a particular DCI field can be indicated differentially, wherein a first set of bits in the DCI field indicate a superset of all RBs scheduled among the multiple TRPs, while a second set of bits in the DCI field indicates a differential resource allocation corresponding to each TRP. These various embodiments are described in more detail below.

As briefly mentioned above, in some embodiments, the frequency- and/or time-domain resource allocation fields of the DCI can be a function of a "transmit profile" field of the DCI. For example, a "transmit profile" can be defined in various ways to identify the characteristics of the traffic to be carried on the PHY. Below are some exemplary transmit profile values and corresponding exemplary traffic characteristics:

Transmit Profile #0 indicates traffic without low-latency nor high-reliability requirement (e.g., eMBB traffic);
Transmit Profile #1 indicates traffic with low-latency but not high-reliability requirement, for example, latency target 1-2 ms and reliability target $10^{-3}$ at physical layer;
Transmit Profile #2 indicates traffic without low-latency requirement but with high-reliability requirement, for example, latency target 10-15 ms and reliability target $10^{-6}$ at physical layer;
Transmit Profile #3 indicates traffic with both low-latency and high-reliability requirement, for example, latency target 1-2 ms and reliability target $10^{-6}$ at physical layer.

In addition to latency and/or reliability requirements, other requirements such as maximum target data rate can be included in one or more transmit profiles. According to exemplary embodiments, the transmit profile value can be used to indicate the number of frequency domain resource allocations in the DCI, particularly a number of frequency domain resource allocations that would be advantageous, beneficial, and/or optimal for the traffic identified by the traffic profile value.

The Transmit Profile can be signaled to the UE in various ways for both PDSCH and PUSCH, including dynamically as a field of DCI. DCI-based signaling can be particularly beneficial if the UE is expected to handle both eMBB and URLLC traffic concurrently. For UEs handling a single traffic type for a relatively long period, the Transmit Profile of PDSCH and/or PUSCH can be semi-statically configured via RRC.

In the following discussion of the principles of these embodiments, one TRP is assumed to have four or fewer antenna ports, and thus is capable of carrying one CW. Although TRPs with more than four antenna ports can carry two CWs, the same principles can be applied with some modifications available to a skilled person. Furthermore, unless otherwise noted explicitly, the embodiments are applicable to PDSCH transmissions that are either dynamically scheduled (i.e., each PDSCH has an associated DCI) or semi-persistently scheduled (i.e., RRC configured PDSCH transmission which is activated and deactivated by a DCI).

In one form of these exemplary embodiments, various transmit profiles can be implicitly associated with different TRP sand time/frequency resource allocation. For example, Transmit Profile #0 above can be mapped to Rel-15 operation, such that one PDCCH schedules PDSCH transmission over a single frequency resource allocation and a single time resource allocation. Likewise, Transmit Profiles #1-3 above can be mapped to transmit formats where one PDCCH schedules transmission over multiple frequency- and/or time-domain resource allocations used by multiple TRPs. For example, Transmit Profile #1 can be mapped to a transmit format where two CWs are sent across the multiple TRPs in the same time-domain resources, but the same or different frequency-domain resources.

As another example, Transmit Profiles 2-3, which support high reliability requirements, can be mapped to the transmit formats where the same CW is repeated across multiple TRPs, with each TRP using different time-frequency resources. Since higher latency is tolerable in Transmit Profile #2, each TRP can be allocated resources distributed in time to repeat the same CW for increased reliability. As an example, TRP0 can uses (mini-)slot j, TRP1 can use (mini-)slot j+1, etc. In this case, the TRPs can use the same frequency-domain resources. In contrast, since Transmit Profile #3 requires both low latency and high reliability, it can be associated with resource allocations in which the TRPs transmit the same CW using the same time domain resources but different frequency-domain resources.

Various exemplary techniques can be used to indicate different time-domain resources. For example, each of the multiple TRPs can be associated with different repetitions that use consecutive time-domain resources. This can be achieved by pre-defining a mapping between TCI state and repetition number. For example, for repetition number j, j=0, 1, . . . , J−1, the TCI state is TCI(j)=j mod $N_{TCI}$, where J is the total number of repetitions in time and $N_{TCI}$ is the total number of TCI states available. If $N_{TCI}$=4 TCI states are available, and there are six time-consecutive repetitions of the same CW, then the TCI states used for the respective repetitions would be {0, 1, 2, 3, 0, 1}. The time-consecutive repetitions can be in consecutive slots or consecutive mini-slots, which would reduce transmission latency for collection of repetitions.

Various exemplary techniques can also be used to indicate different frequency-domain resources. In general, a UE can be assigned one or more frequency domain resource allocations within a single DCI field, e.g., a 'Frequency domain resource assignment' field in NR. In some embodiments, the UE can determine how many frequency domain resource allocations are included in this single field by a further DCI field, such as the TCI state ID field discussed above. Such embodiments facilitate dynamic switching, within a single DCI field, between single and multiple frequency-domain resource allocations within a single DCI field, even for multi-source (e.g., multi-TRP) transmissions.

In some embodiments, a DCI field (e.g., 'Frequency domain resource assignment') can indicate up to a maximum number M of frequency domain resource allocations, such that the actual number of frequency domain resource allocations in the 'Frequency domain resource assignment' DCI field can be 1, 2, . . . , or M. The maximum number M can be RRC configured or fixed in specifications.

In such embodiments, the actual number of frequency domain resource allocations in the 'Frequency domain resource assignment' DCI field can be determined based on the value of the TCI field also included in the DCI. In one particular embodiment, the TCI field can indicate an extended TCI state that includes one or more source RS QCL type pairs. In such case, if the extended TCI state contains a single QCL type pair (e.g., {qcl-Type1,qcl-Type2}), then the UE can determine the actual number of frequency domain resource allocations to be one. More generally, if the extended TCI state indicated in the TCI field contains m≤M QCL type pairs (e.g., {qcl-Type1,qcl-Type2}$_A$, {qcl-Type1,qcl-Type2}$_B$, etc.), then the UE can determine the actual number of frequency domain resource allocations to be m.

For URLLC applications, PDSCH may be repeated from multiple TRPs and the TCI field may indicate the TCI state(s) or extended TCI state(s) when the UE is being scheduled for PDSCH with repetition. Table 10 below shows an exemplary mapping of two-bit TCI field values to TCI states used for four different PDSCH repetitions. For example, TCI value '00' selects repetition across four different TCI states for four different transmission sources (e.g., TRPs). Based on this value, the UE can determine that the actual number of frequency domain resource allocations contained in DCI is four. More generally, if the TCI value selects a PDSCH repetition pattern that is limited to k TCI states for k transmission sources, then the UE can determine that the actual number of frequency domain resource allocations contained in DCI is k.

TABLE 10

| TCI field in DCI | PDSCH repetition 0 | PDSCH repetition 1 | PDSCH repetition 2 | PDSCH repetition 3 |
| --- | --- | --- | --- | --- |
| 00 | TCI state #0 | TCI state #1 | TCI state #2 | TCI state #3 |
| 01 | TCI state #0 | TCI state #1 | TCI state #0 | TCI state #1 |
| 10 | TCI state #0 | TCI state #2 | TCI state #0 | TCI state #2 |
| 11 | TCI state #0 | TCI state #0 | TCI state #0 | TCI state #0 |

In some variations, the maximum number M of frequency domain resource allocations in the 'Frequency domain resource assignment' DCI field can be smaller than the number of source RS QCL pairs in an extended TCI state indicated by the TCI field. For example, an extended TCI state indicated by the TCI field can contain N QCL type pairs where N>M and where each QCL type pair may correspond to transmission from a TRP, a panel, or beam. In this case, the UE can determine the m$^{th}$ frequency-domain resource allocation for the n$^{th}$ QCL type pair based on some predetermined mapping.

One example of such a predetermined mapping is $$m = \mathrm{mod}\left(n, \frac{N}{M}\right).$$

In this example, if there are N=4 QCL type pairs in an extended TCI state indicated by the TCI field, and a maximum of M=2 frequency domain resource allocations, the first two QCL type pairs correspond to the first frequency domain resource allocation and the last two QCL type pairs correspond to the second frequency domain resource allocation. Similar predetermined mappings can also be defined for URLLC application when the maximum number M of frequency domain resource allocations is smaller than the number of TCI states indicated by the TCI field, where each distinct TCI state may correspond to a different TRP, panel, or beam.

Such embodiments are applicable to downlink resource allocation types 0 and 1. In the case of type 1, m different starting VRBs ($RB_{start}$) and m different lengths ($L_{RBs}$) can be jointly encoded, where m is indicated by the TCI field. In other variants, m different starting VRBs can be jointly encoded with a single length, with m being indicated by the TCI field and the single length $L_{RBs}$ applying to all m resource allocations. In the case of type 0, when m frequency domain resource allocations are indicated by the TCI field, the UE can determine (based on that information) that the RBG size is scaled by a factor of m. For instance, if the RBG size associated with a single frequency domain resource allocation is P, then the RBG size associated with m>1 frequency domain resource allocations is m×P. As such, if the frequency domain resource allocation field contains ⌈N/P⌉ bits, then these bits are divided into m parts each containing ⌈N/mP⌉ bits. The first ⌈N/mP⌉ bits signals the first frequency domain resource allocation, the next part containing the next ⌈N/mP⌉ bits signals the second frequency domain resource allocation, and so on.

In other embodiments, M frequency-domain resources can be semi-statically configured by RRC, e.g., {resource #1, . . . , resource #M}. In such case, the DCI field needs to indicate only which of the M resources is used for the first scheduled PDSCH. For example, if resource #k (k=1, . . . , M) is indicated by the DCI, then the m resources for the m scheduled PDSCH can be determined as {resource #k, resource #k+1, . . . , resource #k+m−1}.

In other embodiments, the M frequency domain resources are defined by the combination of a single frequency domain resource and an offset, Δf, defined in units of RB or RBG. As an example, the single frequency domain resource is composed of $\{RB_0, RB_1, \ldots, RB_n\}$, and offset Δf is defined in number of RB. If M=4 frequency domain resources are defined in a BWP containing $N_{RB}^{DL,BWP}$ RBs, then the four frequency domain resources can be defined as:

$\{RB_0, RB_1, \ldots, RB_n\}$;

$\mathrm{Mod}(\{RB_0, RB_1, \ldots, RB_n\} + \Delta f, N_{RB}^{DL,BWP})$;

$\mathrm{Mod}(\{RB_0, RB_1, \ldots, RB_n\} + 2 \times \Delta f, N_{RB}^{DL,BWP})$; and $\mathrm{Mod}(\{RB_0, RB_1, \ldots, RB_n\} + 3 \times \Delta f, N_{RB}^{DL,BWP})$.

The offset Δf can be signaled to the UE in various ways. If the offset is semi-static, it can be signaled by higher-layer signaling, e.g., RRC. If the offset is dynamic, it can be signaled by DCI, e.g., by adding a new DCI field to contain the offset. For example, a two-bit field could be used to indicate four possible offset values. Alternately, a combination of semi-static and dynamic configuration can be used. For example, RRC signaling could provide the set of four possible offset values, and DCI could be used to indicate a particular offset from the previously configured set of four.

In other embodiments, the multiple resource allocation corresponding to the multiple TRPs can be indicated differentially according to various techniques. As one example, a first resource allocation can be used to indicate the superset of all RBs scheduled for the multiple TRPs, and a set of second differential resource allocations can be used to indicate RBs corresponding to each TRP. For example, each differential resource allocation can indicate to which RBs of the first resource allocation that the PDSCH layer for the corresponding TRP should not be mapped. In this manner, the UE can determine the resource allocation for each TRP based on removing the RBs of each of the differential allocations from the superset of all scheduled RBs indicated by the first allocation.

As an example of these embodiments, the first resource allocation can be expressed as a Type 1 allocation (e.g., staring PRB and length) while the set of second differential resource allocations can be expressed as a Type 0 allocation (e.g., bitmap). The first and second differential allocations can be mapped to separate sub-fields of the Frequency Domain Resource Allocation DCI field, or jointly encoded into a single field in various ways. As another example, the set of differential resource allocations can be jointly encoded using a reduced number of bits such that not all possible combinations may be indicated by the field or sub-field.

For the case of partially overlapping resource allocation of the multiple TRPs, the rank of the PDSCH will vary across the allocated frequency resource. Consider the scenario where two TRPs are allocated two layers each using a partially overlapping resource allocation. On the resource blocks where the two allocations overlap, the rank (e.g., the number of layers) of the PDSCH will be four, whereas on the non-overlapping resource blocks the rank of the PDSCH will be two. Such a difference in the number of layers across the frequency resources will cause an ambiguity in how the DMRS ports are mapped.

In some embodiments, the antenna ports field of the scheduling DCI indicates the maximum number of layers $$v_{max} = \max_{f \in F} v_f$$

across the entire scheduled frequency resource F, where $v_f$ is the number of layers on resource block f, along with the scheduled $v_{max}$ DMRS port indices $\{p_0, p_1, \ldots, p_{v_{max}-1}\}$. When the number of layers scheduled on a resource block is smaller than the maximum number of layers, as may be determined by the UE from the frequency-domain allocations, a rule is used to map the actually transmitted layers on a resource block to a subset of the DMRS ports $\{p_0, p_1, \ldots, p_{v_{max}-1}\}$. In one such embodiment, the first $v_f$ of the indicated DMRS ports (according to the order given by the Antenna port table) may map to layers transmitted from different TRPs in different RBs. This implies that the e.g. antenna ports $\{p_0, p_1\}$ may be mapped to layers transmitted from a first TRP on some resource blocks and mapped to layers transmitted from another TRP on other resource blocks.

However, changing the DMRS port to TRP allocation may be problematic in case the resource allocation for a TRP changes within a precoding resource block group (PRG) consisting of a number of consecutive PRBs, with the number dependent on the system bandwidth size $N^{DL}_{RB}$ PRBs. This may be solved by imposing a scheduling restriction so this scenario never occurs. Alternatively, in some embodiments, the antenna port to TRP mapping can be fixed so that each TRP is allocated a fixed subset of the DMRS antenna ports that are valid for the entire resource allocation of the PDSCH. For instance, TRP A is allocated DMRS ports $\{p_0, p_1\}$ while TRP B is allocated DMRS ports $\{p_2, p_3\}$.

In some embodiments, DMRS antenna ports corresponding to all the $v_{max}$ layers are transmitted on the entire frequency-domain resource allocation, regardless if the corresponding PDSCH layers are present or not. This may be useful if a wideband PRG size is used, which enables the UE to perform wideband channel estimation. In other embodiments, the DMRS ports are only present on resource blocks where the corresponding PDSCH layers are also present. In lieu of transmitting DMRS ports of the non-allocated TRP, PDSCH may be mapped to those REs.

In other embodiments, the UE can determine how many frequency domain resource allocations are included in a DCI field (e.g., NR 'Frequency domain resource assignment' field) based on a redundancy version (RV) DCI field. Such embodiments also facilitate dynamic switching, within a single DCI field, between single and multiple frequency-domain resource allocations within a single DCI field, even for multi-source (e.g., multi-TRP) transmissions. This can be beneficial for URLLC applications where different RVs of the same data packet are transmitted from multiple TRPs in overlapping OFDM symbols but in different frequency-domain resource allocations.

Similar to other embodiments, a DCI field (e.g., 'Frequency domain resource assignment') can indicate up to a maximum number M of frequency domain resource allocations, such that the actual number of frequency domain resource allocations in the 'Frequency domain resource assignment' DCI field can be 1, 2, . . . , or M. The maximum number M can be RRC configured or fixed in 3GPP specifications. The actual number (i.e., m≤M) of frequency domain resource allocations contained in the DCI field can be determined based on the value of the DCI RV field.

For URLLC applications, PDSCH may be repeated from multiple TRPs and the DCI RV field can indicate which redundancy versions (RVs) of a data block are scheduled in the respective PDSCH repetitions. Table 11 below shows an exemplary mapping of two-bit RV field values to RVs used for four different PDSCH repetitions. For example, RV field value '00' selects a single RV to be transmitted in a single PDSCH repetition from a single transmission source (e.g., TRP). Based on this value, the UE can determine that the actual number of frequency domain resource allocations contained in the DCI is one. More generally, if the RV field value selects a PDSCH repetition pattern that is limited to k RVs transmitted by k respective sources, then the UE can determine that the number of frequency domain resource allocations contained in DCI is k.

TABLE 11

| RV value in DCI | PDSCH repetition 0 | PDSCH repetition 1 | PDSCH repetition 2 | PDSCH repetition 3 |
| --- | --- | --- | --- | --- |
| 00 | RV #0 | — | — | — |
| 01 | RV #1 | RV #0 | RV #3 | — |
| 10 | RV #2 | RV #3 | RV #0 | — |
| 11 | RV #3 | RV #0 | RV #1 | RV #2 |

Note that RV-based allocation determination and/or mapping is applicable to both type 0 and type 1 resource allocations. In addition, it can be particularly beneficial and/or advantageous for dynamically scheduled PDSCH and any other transmission scenarios in which the RV DCI field is not required to be set to a particular value, including retransmissions of semi-persistently scheduled (SPS) data.

In other embodiments, the UE can determine how many frequency domain resource allocations are included in a DCI field (e.g., NR 'Frequency domain resource assignment' field) by an antenna ports (AP) DCI field. Such embodiments also facilitate dynamic switching, within a single DCI field, between single and multiple frequency-domain resource allocations within a single DCI field, even for multi-source (e.g., multi-TRP) transmissions.

Similar to other embodiments, a DCI field can indicate up to a maximum number M of frequency domain resource allocations, such that the actual number of frequency domain resource allocations in the 'Frequency domain resource assignment' DCI field can be 1, 2, . . . , or M. The maximum number M can be RRC configured or fixed in specifications. The actual number (i.e., m≤M) of frequency domain resource allocations contained in the DCI field can be determined based on the value of the AP DCI field.

As discussed in more detail above, the AP DCI field can indicate the antenna ports used to transmit DM-RS by the respective sources (e.g., TRPs). In some of these embodiments, the UE can determine the number of frequency-domain resource allocations comprising the DCI field based on the number of DM-RS antenna ports indicated by the AP DCI field. In other words, if the AP DCI field value indicates that k antenna ports are used for DM-RS, then the UE can determine that the number of frequency domain resource allocations contained in DCI is k.

In other alternatives, the value of the AP DCI field can be used in combination with values of one or more other DCI fields to determine the number of frequency domain resource allocations contained in DCI. For example, if the TCI DCI field indicates DMRS antenna ports that belong to k CDM groups, then the UE can determine that the number of frequency domain resource allocations contained in DCI is k. As another alternative, all DMRS port(s) indicated by the AP DCI field can be assumed to be used in all the frequency domain resource allocations comprising the DCI field, with the UE determining the actual number of frequency domain resource allocations using one or both of the TCI field and RV field.

In other embodiments, the values of other DCI fields can be used to indicate the actual number of frequency domain resource allocations contained in DCI, either individually or in combination with DCI fields discussed above. In such case, the resources per repetition can be configured by RRC. In one embodiment, the RNTI assigned to the PDCCH can be used to distinguish whether or not PDSCH repetition should apply. As an example, repetition is not applicable if PDCCH is associated with C-RNTI but is applicable (e.g., according to previous RRC configuration) if PDCCH is associated with a particular type of RNTI that can be used to indicate URLLC traffic type (e.g., URLLC-C-RNTI).

If the other DCI field(s) (e.g., RNTI) indicates that PDSCH repetition should not apply, then the UE can determine that the number of frequency domain resource allocations in the 'Frequency domain resource assignment' DCI field is one. On other hand, if the other DCI field(s) indicates that PDSCH repetition should apply, then the UE can determine the number of frequency domain resource allocations based on values of one or more other DCI fields (e.g., TCI, RV, AP, etc.), such as in manner described above with respect to other exemplary embodiments.

In other embodiments, additional bits and/or sub-fields can be included in the 'Frequency domain resource assignment' DCI field to indicate the number of frequency domain resource allocations in that same field. In one example, when a single additional bit is included in this DCI field, this bit can indicate whether one (e.g., by bit-value of "0") or two (e.g., by bit-value of "1") frequency domain resource allocations are included in the DCI field. In a second example, when two additional bits are included in this DCI field, these bits can be used to indicate up to four different numbers of frequency domain resource allocations (e.g., 1-4 or some other numbers).

In other embodiments, a combination of an RRC configuration and the RNTI assigned to the PDCCH can be used to determine whether a single PDCCH schedules multiple PDSCH repetitions in the same slot (or in different slots) by multiple transmission sources (e.g., TRPs). For example, a UE may be configured by RRC to receive multiple PDSCH repetitions when a PDCCH is scrambled by a particular RNTI associated with the URLLC service (e.g., URLLC-C-RNTI). RRC configuration can also be used to indicate the number of PDSCH transmissions, as well as that multiple PDSCH repetitions carry the same data payload but have different RV values. Based on receiving a PDCCH with the particular RNTI, the UE can determine the number of PDSCHs scheduled by the PDCCH, the frequency (and/or time) domain resource allocation, the RV, the DMRS port(s), and the QCL information for each of the PDSCHs based on both the RRC configuration and the PDCCH DCI content.

These embodiments described above can be further illustrated with reference to FIGS. 11-12, which depict exemplary methods performed by a UE and a wireless network, respectively. In other words, various features of the operations described below, with reference to FIGS. 11-12, correspond to various embodiments described above.

Figure 11:
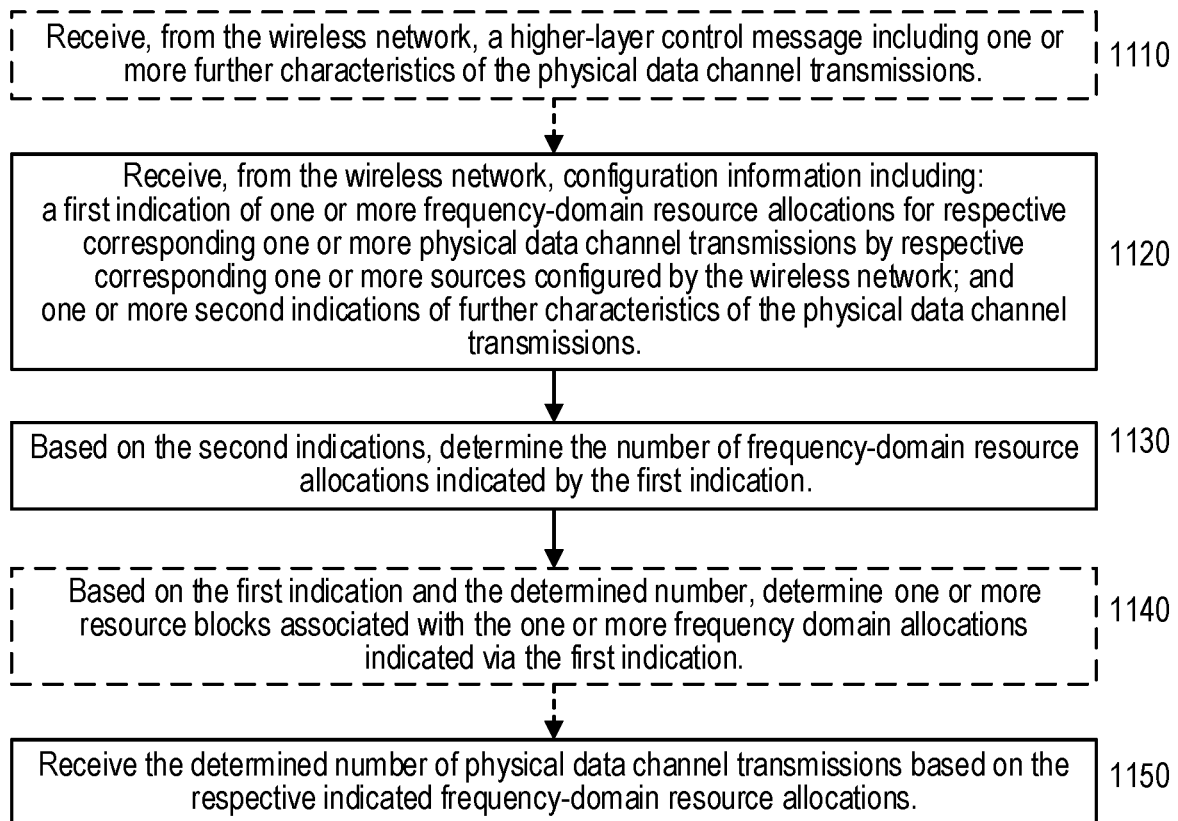
FIG. 11 shows a flow diagram of an exemplary method (e.g., procedure) for a user equipment (UE, e.g., wireless device, IoT device, etc.), according to various exemplary embodiments of the present disclosure.

More specifically, FIG. 11 shows a flow diagram of an exemplary method (e.g., procedure) for receiving physical data channel transmissions from a wireless network, according to various exemplary embodiments of the present disclosure. The exemplary method can be performed by a user equipment (UE, e.g., wireless device, IoT device, modem, etc. or component thereof) in communication with one or more network nodes (e.g., base stations, gNBs, en-gNBs, TRPs, etc., or components thereof) in the wireless network (e.g., NG-RAN). For example, the exemplary method shown in FIG. 11 can be implemented in a UE configured as described herein with reference to other figures. Furthermore, the exemplary method shown in FIG. 11 can be used cooperatively with other exemplary methods described herein (e.g., FIG. 12) to provide various exemplary benefits and/or advantages. Although FIG. 11 shows specific blocks in a particular order, the operations of the exemplary method can be performed in a different order than shown and can be combined and/or divided into blocks having different functionality than shown. Optional blocks or operations are indicated by dashed lines.

In some embodiments, the exemplary method illustrated in FIG. 11 can include the operations of block 1110, where the UE can receive, from the wireless network, a higher-layer control message including one or more further characteristics of the physical data channel transmissions. For example, the higher-layer control message can be an RRC message. Various further characteristics can be included according to various embodiments.

In some embodiments, the control message can include a plurality of traffic control indicator (TCI) states. For example, each TCI state can include one or more pairs of source RS QCL relationships, as discussed above.

In some embodiments, the control message can include includes a plurality of traffic profiles, each traffic profile including a plurality of characteristics related to a particular type of data service. In some embodiments, the control message can include a configuration of frequency-domain resources associated with each of a plurality of PDSCH repetitions transmitted by a respective plurality of sources. In some embodiments, the control message can include a plurality of redundancy version (RV) configurations, each RV configuration associating one or more RVs of a single data block with a plurality of PDSCH repetitions transmitted by a respective plurality of sources. In some embodiments, the control message can include a plurality of antenna port (AP) configurations, each AP configuration identifying one or more demodulation reference signal (DM-RS) associated with a plurality of PDSCH repetitions transmitted by a respective plurality of sources. These characteristics are not exclusive, and can be combined with other similar characteristics that are related to PDSCH transmissions.

The exemplary method can also include the operations of block 1120, where the UE can receive configuration information from the wireless network. The configuration information can include a first indication of one or more frequency-domain resource allocations for respective corresponding one or more physical data channel transmissions by respective corresponding one or more sources configured by the wireless network. The configuration information can also include one or more second indications of further characteristics of the physical data channel transmissions.

In embodiments that include the operations of block 1110, the second indications can identify (e.g., point to) particular configurations and/or options received in the higher-layer control message. Even so, the further characteristics identified by the second indications can be the same as or different from the further characteristics identified in the control message that can be received in some embodiments (e.g., in block 1110).

In various embodiments, the configuration information can be received via a downlink message having one or more of the following characteristics: a single message; received via a single physical downlink control channel (PDCCH); and received via a downlink control information (DCI) scheduling grant.

In various embodiments, when the first and second indications are received in a single DCI message, the second indications can include any of the following: traffic profile indicator field in the single DCI message; transmit control indicator (TCI) state field in the single DCI message; redundancy version (RV) field in the single DCI message; antenna ports (AP) indicator field in the single DCI message; and radio network temporary identifier (RNTI) associated with the PDCCH (e.g., used to scramble the CRC).

In some embodiments, where the first and second indications are received in a single DCI message, the second indications can be included in a TCI state field of the DCI message, where the TCI state field identifies one or more TCI states. In such embodiments, the frequency domain resource allocations can be non-overlapping, and each non-overlapping frequency domain resource allocation can be associated with a corresponding TCI state indicated by the second indications.

Furthermore, in some of these embodiments, each TCI state, indicated by the second indication, includes one or more source reference signal (RS) pairs, each of which has a corresponding pair of quasi-colocation (QCL) relations with antenna ports for demodulation reference signals (DM-RS). In some of these embodiments, the respective sources configured by the wireless network correspond to one of the following: the respective TCI states indicated by the second indications; or the respective pairs of QCL relationships included in the TCI states indicated by the second indications.

In some of these embodiments, the configuration information also includes a third indication of a plurality of the antenna ports for DM-RS, where the indicated plurality of antenna ports are associated with all frequency domain resource allocations indicated by the first indication.

In some of these embodiments, the one or more TCI states, indicated by the second indication, can correspond to a code-division multiplexing (CDM) group that is associated with each of the physical data channel transmissions. In such embodiments, each physical data channel transmission can be received (e.g., in block 1150, described below) in association with DMRS that have antenna ports with QCL relations included in the corresponding TCI state.

In some embodiments, where the higher-layer control message (e.g., received in block 1110) includes a plurality of TCI states, the second indications (e.g., received in block 1120) can include an indication of one or more of the TCI states included in the higher-layer control message. In this manner, for example, a DCI including the second indications can be used to dynamically select TCI states previously configured via RRC. Other examples include:
  the second indications can include a traffic profile indicator that identifies a particular one of a plurality of traffic profiles included in the control message.
  the second indications can include an RV indicator that identifies a particular RV configuration included in the control message.
  the second indications can include an AP indicator that identifies a particular AP configuration included in the control message.

The first indication can have various formats associated with various embodiments. In some embodiments, the first indication can include first and second fields. In such embodiments, the first field can identify a superset of frequency-domain resource allocations for a plurality of transmission sources, while the second field can identify, for each transmission source, a subset of the superset identified by the first field. For example, the subset identified for each transmission source can include the frequency-domain resource allocations, of the superset, that are not used for that particular transmission source.

In some embodiments, the first indication can include a first set of bits and a second set of bits in a single field. In such embodiments, the first set of bits can identify a superset of frequency-domain resource allocations for a plurality of transmission sources, while the second set of bits can identify, for each transmission source, a subset of the superset identified by the first set of bits. For example, the subset identified for each transmission source can include the frequency-domain resource allocations, of the superset, that are not used for that particular transmission source.

The exemplary method can also include the operations of block 1130, where the UE can, based on the second indications, determine the number of frequency-domain resource allocations indicated by the first indication. In some embodiments, this determination is not based on the first indication. In other words, the determination of the number of frequency-domain resource allocations can be based on the second indications and, in certain embodiments, configuration information received in the higher-layer control message.

In some embodiments, the number of frequency-domain resource allocations indicated by the first indication can be determined based on one or more of the following: the number of TCI states indicated by the second indications; and the number of pairs of QCL relations included in the TCI states indicated by the second indications. For example, each TCI state or each QCL pair can correspond to a transmission from a different source.

In other embodiments, the number of frequency-domain resource allocations are determined to be greater than one if a traffic profile indicator, of the second indications, identifies a traffic profile associated with a first type of data service. Likewise, the number of frequency-domain resource allocations are determined to be one if the traffic profile indicator identifies a traffic profile associated with a second type of data service. For example, the first type of data service can be enhanced mobile broadband (eMBB) and the second type of data service can be ultra-reliable low-latency communications (URLLC).

In other embodiments, the number of frequency-domain resource allocations can be determined to be the number of repetitions configured in the control message, if an RNTI (of the second indications) is associated with a first type of data service. Likewise, the number of frequency-domain resource allocations are determined to be one if the RNTI is not associated with the first type of data service. For example, the first type of data service can be URLLC.

In other embodiments, the number of frequency-domain resource allocations can be determined based on the number of RVs, of the single data block, that are included in the particular RV configuration that is indicated by one of the second indications. In other embodiments, the number of frequency-domain resource allocations can be determined based on the number of DM-RS ports included in the particular antenna port configuration that is indicated by one of the second indications.

In some embodiments, the exemplary method can also include the operations of block 1140, where the UE can, based on the first indication (e.g., received in block 1120) and the determined number (e.g., from block 1130), determine one or more resource blocks within the one or more frequency domain allocations.

The exemplary method can also include the operations of block 1150, where the UE can receive, from the wireless network, the determined number of physical data channel transmissions based on the respective indicated frequency-domain resource allocations. In embodiments that include the operations of block 1140, the UE can also receive the determined number of physical data channel transmission based on the determined resource blocks. In some embodiments, where a plurality of physical data channel transmissions are received in block 1150, each transmission can carry a different redundancy version (RV) of a single data block. This diversity arrangement can facilitate improved reliability, as discussed in more detail above.

Figure 12:
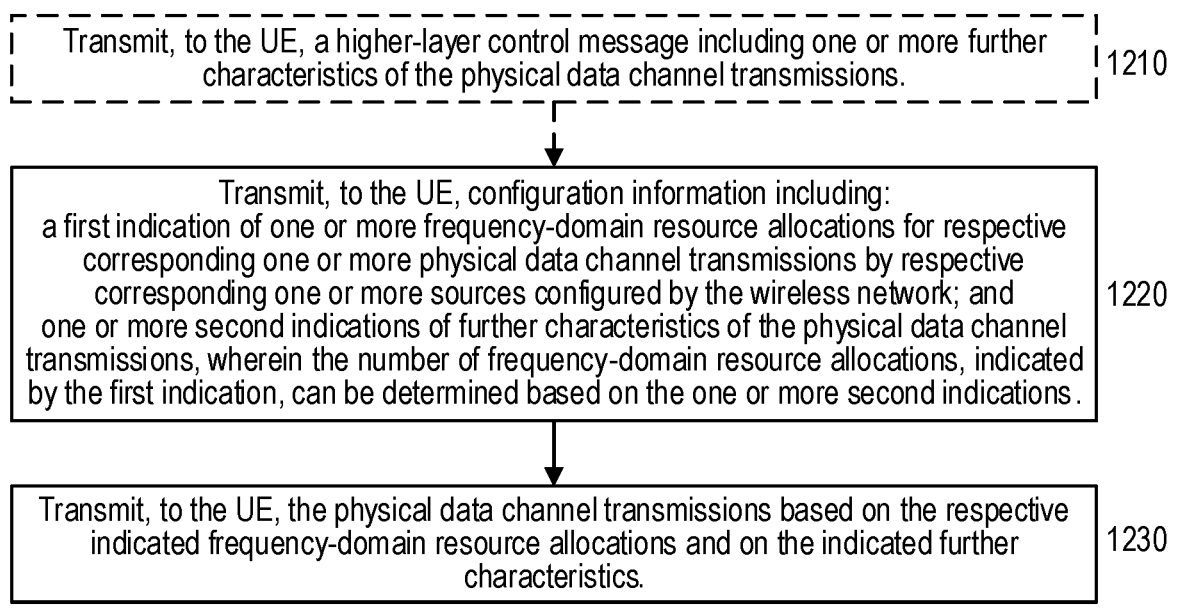
FIG. 12 shows a flow diagram of an exemplary method (e.g., procedure) for a wireless network including one or more network nodes (e.g., base stations, gNBs, eNBs, en-gNBs, TRPs, etc.), according to various exemplary embodiments of the present disclosure.

In addition, FIG. 12 shows an exemplary method (e.g., procedure) for performing physical data channel transmissions to a user equipment (UE), according to various exemplary embodiments of the present disclosure. The exemplary method can be performed by a wireless network (e.g., NG-RAN) comprising one or more nodes (e.g., base stations, gNBs, en-gNBs, TRPs, etc., or components thereof) that communicate with the UE. For example, the exemplary method shown in FIG. 12 can be implemented in one or more network nodes configured as described herein with reference to other figures. Furthermore, the exemplary method shown in FIG. 12 can be used cooperatively with other exemplary methods described herein (e.g., FIG. 11) to provide various exemplary benefits and/or advantages.

Although FIG. 12 shows specific blocks in a particular order, the operations of the exemplary method can be performed in a different order than shown and can be combined and/or divided into blocks having different functionality than shown. Optional blocks or operations are shown by dashed lines.

In some embodiments, the exemplary method illustrated in FIG. 12 can include the operations of block 1210, where the wireless network can transmit, to the UE, a higher-layer control message including one or more further characteristics of the physical data channel transmissions. For example, the higher-layer control message can be an RRC message. Various further characteristics can be included according to various embodiments.

In some embodiments, the control message can include a plurality of traffic control indicator (TCI) states. For example, each TCI state can include one or more pairs of source RS QCL relationships, as discussed above.

In some embodiments, the control message can include includes a plurality of traffic profiles, each traffic profile including a plurality of characteristics related to a particular type of data service. In some embodiments, the control message can include a configuration of frequency-domain resources associated with each of a plurality of PDSCH repetitions transmitted by a respective plurality of sources. In some embodiments, the control message can include a plurality of redundancy version (RV) configurations, each RV configuration associating one or more RVs of a single data block with a plurality of PDSCH repetitions transmitted by a respective plurality of sources. In some embodiments, the control message can include a plurality of antenna port (AP) configurations, each AP configuration identifying one or more demodulation reference signal (DM-RS) associated with a plurality of PDSCH repetitions transmitted by a respective plurality of sources. These characteristics are not exclusive, and can be combined with other similar characteristics that are related to PDSCH transmissions.

The exemplary method can also include the operations of block 1220, where the wireless network can transmit configuration information to the UE. The configuration information can include a first indication of one or more frequency-domain resource allocations for respective corresponding one or more physical data channel transmissions by respective corresponding one or more sources configured by the wireless network. The configuration information can also include one or more second indications of further characteristics of the physical data channel transmissions.

Furthermore, the number of frequency-domain resource allocations, indicated by the first indication, can be determined based on the one or more second indications. In some embodiments, the number of frequency-domain resource allocations, indicated by the first indication, can be determined based on the one or more second indications (and, in certain embodiments, configuration information received in the higher-layer control message) without reference to the first indication. In other words, in such embodiments, the number or quantity of frequency-domain resource allocations can be determined independent of the first indication.

In embodiments that include the operations of block 1210, the second indications can identify (e.g., point to) particular configurations and/or options received in the higher-layer control message. Even so, the further characteristics identified by the second indications can be the same as or different from the further characteristics identified in the control message that can be transmitted in some embodiments (e.g., in block 1210).

In various embodiments, the configuration information can be transmitted via a downlink message having one or more of the following characteristics: a single message; received via a single physical downlink control channel (PDCCH); and received via a downlink control information (DCI) scheduling grant.

In various embodiments, when the first and second indications are transmitted in a single DCI message, the second indications can include any of the following: traffic profile indicator field in the single DCI message; transmit control indicator (TCI) state field in the single DCI message; redundancy version (RV) field in the single DCI message; antenna ports (AP) indicator field in the single DCI message; and radio network temporary identifier (RNTI) associated with the PDCCH (e.g., used to scramble the CRC).

In some embodiments, where the first and second indications are transmitted in a single DCI message, the second indications can be included in a TCI state field of the DCI message, where the TCI state field identifies one or more TCI states. In such embodiments, the frequency domain resource allocations can be non-overlapping, and each non-overlapping frequency domain resource allocation can be associated with a corresponding TCI state indicated by the second indications.

Furthermore, in some of these embodiments, each TCI state, indicated by the second indication, includes one or more source reference signal (RS) pairs, each of which has a corresponding pair of quasi-colocation (QCL) relations with antenna ports for demodulation reference signals (DM-RS). In some of these embodiments, the respective sources configured by the wireless network correspond to one of the following: the respective TCI states indicated by the second indications; or the respective pairs of QCL relationships included in the TCI states indicated by the second indications.

In some of these embodiments, the configuration information also includes a third indication of a plurality of the antenna ports for DM-RS, where the indicated plurality of antenna ports are associated with all frequency domain resource allocations indicated by the first indication.

In some of these embodiments, the one or more TCI states, indicated by the second indication, can correspond to a code-division multiplexing (CDM) group that is associated with each of the physical data channel transmissions. In such embodiments, each physical data channel transmission can be transmitted (e.g., in block 1250, described below) in association with DMRS that have antenna ports with QCL relations included in the corresponding TCI state.

In some embodiments, where the higher-layer control message (e.g., transmitted in block 1210) includes a plurality of TCI states, the second indications (e.g., transmitted in block 1220) can include an indication of one or more of the TCI states included in the higher-layer control message. In this manner, for example, a DCI including the second indications can be used by the wireless network to dynamically select TCI states previously configured via RRC. Other examples include:

- the second indications can include a traffic profile indicator that identifies a particular one of a plurality of traffic profiles included in the control message;
- the second indications can include an RV indicator that identifies a particular RV configuration included in the control message; and
- the second indications can include an AP indicator that identifies a particular AP configuration included in the control message.

The first indication can have various formats associated with various embodiments. In some embodiments, the first indication can include first and second fields. In such embodiments, the first field can identify a superset of frequency-domain resource allocations for a plurality of transmission sources, while the second field can identify, for each transmission source, a subset of the superset identified by the first field. For example, the subset identified for each transmission source can include the frequency-domain resource allocations, of the superset, that are not used for that particular transmission source.

In some embodiments, the first indication can include a first set of bits and a second set of bits in a single field. In such embodiments, the first set of bits can identify a superset of frequency-domain resource allocations for a plurality of transmission sources, while the second set of bits can identify, for each transmission source, a subset of the superset identified by the first set of bits. For example, the subset identified for each transmission source can include the frequency-domain resource allocations, of the superset, that are not used for that particular transmission source.

In some embodiments, the number of frequency-domain resource allocations indicated by the first indication are based on one or more of the following: the number of TCI states indicated by the second indications; and the number of pairs of QCL relations included in the TCI states indicated by the second indications. For example, each TCI state or each QCL pair can correspond to a transmission from a different source.

In other embodiments, the number of frequency-domain resource allocations are greater than one if a traffic profile indicator, of the second indications, identifies a traffic profile associated with a first type of data service. Likewise, the number of frequency-domain resource allocations is one if the traffic profile indicator identifies a traffic profile associated with a second type of data service. For example, the first type of data service can be enhanced mobile broadband (eMBB) and the second type of data service can be ultra-reliable low-latency communications (URLLC).

In other embodiments, the number of frequency-domain resource allocations is the number of repetitions configured in the control message, if an RNTI (of the second indications) is associated with a first type of data service. Likewise, the number of frequency-domain resource allocations is one if the RNTI is not associated with the first type of data service. For example, the first type of data service can be URLLC.

In other embodiments, the number of frequency-domain resource allocations is based on the number of RVs, of the single data block, that are included in the particular RV configuration that is indicated by one of the second indications. In other embodiments, the number of frequency-domain resource allocations is based on the number of DM-RS ports included in the particular antenna port configuration that is indicated by one of the second indications.

The exemplary method can also include the operations of block 1250, where the wireless network can transmit, to the UE, the physical data channel transmissions based on the respective indicated frequency-domain resource allocations and on the indicated further characteristics (e.g., as indicated in block 1220). In some embodiments, where a plurality of physical data channel transmissions are transmitted in block 1250, each transmission can carry a different redundancy version (RV) of a single data block. This diversity arrangement can facilitate improved reliability, as discussed in more detail above.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
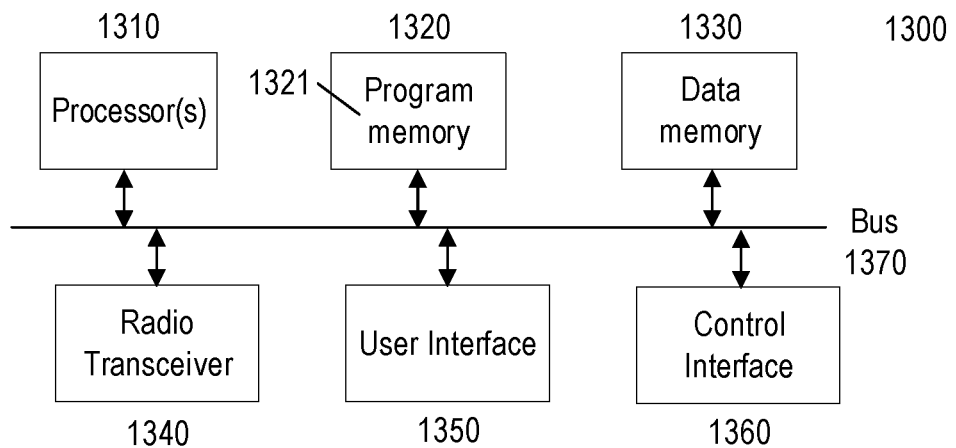
FIG. 13 is a block diagram of an exemplary wireless device or UE according to various exemplary embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, an RS-4135 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any exemplary embodiments (e.g., of methods) described herein.

Figure 14:
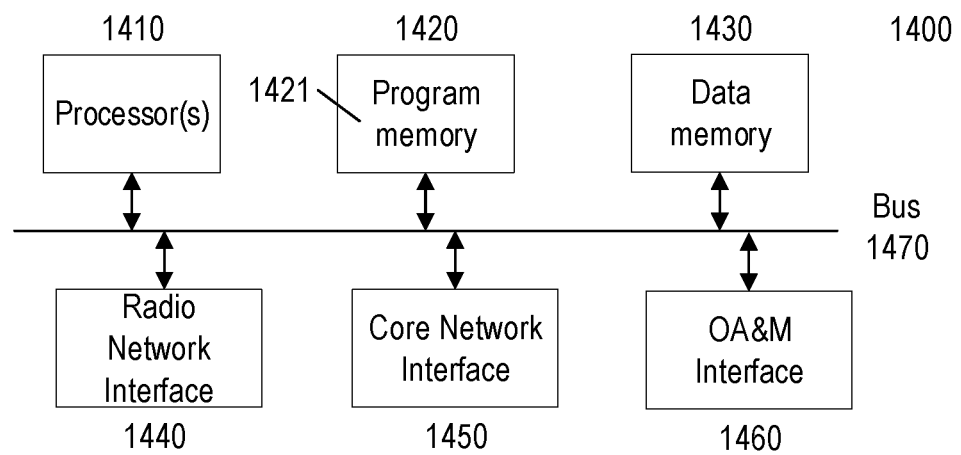
FIG. 14 is a block diagram of an exemplary network node according to various exemplary embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
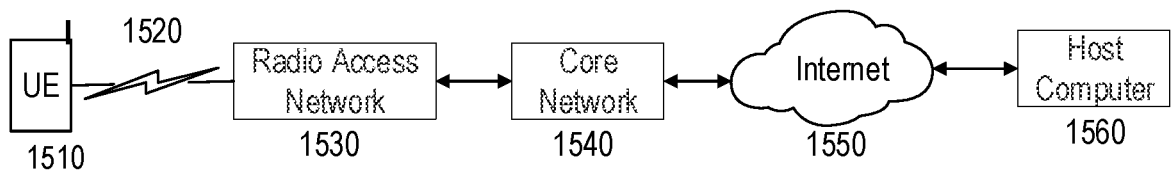
FIG. 15 is a block diagram of an exemplary network configured to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for ultra-reliable, low-latency communication (URLLC) by configuring for UEs—such as UE 1510—to transmit and/or receive multiple versions of a data block on separate physical data channels (e.g., PDSCH or PUSCH). In this manner, PDSCH diversity by multi-TRP transmission to a single UE can be achieved. This can increase reliability, reduce latency, and/or reduce UE complexity. When used in NR UEs (e.g., UE 1510) and gNBs (e.g., gNBs comprising RAN 1530), exemplary embodiments described herein can provide various improvements, benefits, and/or advantages that facilitate the use of data services (e.g., URLLC) having strict performance requirements. As a consequence, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for a user equipment (UE), the method comprising at least one of:
   receiving at least one of the following:
      a first indication of one or more frequency-domain resource allocations for reception of one or more subsequent physical downlink shared channel (PDSCH) transmissions; and
      one or more second indications of further characteristics of the subsequent PDSCH transmissions;
   based on the second indications, determining the number of frequency-domain resource allocations indicated via the first indication;
   based on the first indication and the determined number, determining one or more resource blocks associated with the one or more frequency domain allocations indicated via the first indication; and
   receiving one or more PDSCH according to the determined resource blocks and the indicated further characteristics.
1A. The method of embodiment 1, wherein the first indication and one or more second indications are received via a downlink message having one or more of the following characteristics:
   a single message;
   received via a single physical downlink control channel (PDCCH);
   received via a DCI scheduling grant; and
   received within a single DCI scheduling grant field.
2. The method of any of the above embodiments, wherein determining the number of frequency-domain resource allocations is not based on the first indication.
3. The method of any of the above embodiments, further comprising receiving a higher-layer control message including one or more further characteristics of subsequent PDSCH transmissions, wherein determining the number of frequency-domain resource allocations identified by the first indication is further based on the one or more further characteristics.
4. The method of any of the above embodiments, wherein:
   the first and second indications are received in a single downlink control information (DCI) message, and
   the second indications include one or more of the following:
      traffic profile indicator field in the single DCI message;
      transmit control indicator (TCI) state field in the single DCI message;
      redundancy version (RV) field in the single DCI message;
      antenna ports (AP) indicator field in the single DCI message; and
      radio network temporary identifier (RNTI) associated with the PDCCH.
5. The method of embodiment 3, wherein:
   the control message includes a plurality of traffic profiles, each traffic profile including a plurality of characteristics related to a particular type of data service;
   the second indications include a traffic profile indicator that identifies a particular one of the plurality of traffic profiles included in the control message; and
   the number of frequency-domain resource allocations are determined to be:
      greater than one if the traffic profile indicator identifies a traffic profile associated with a first type of data service; and
      one if the traffic profile indicator identifies a traffic profile associated with a second type of data service.
6. The method of embodiment 5, wherein the first type of data service is enhanced mobile broadband (eMBB) and the second type of data service is ultra-reliable low-latency communications (URLLC).
7. The method of embodiment 3, wherein:
   the control message includes a plurality of traffic control indicator (TCI) states, each TCI state including one or more pairs of source reference signal (RS) quasi-colocation (QCL) relationships;
   the second indications include a TCI state indicator that identifies one or more of the TCI states included in the control message; and
   the number of frequency-domain resource allocations are determined based on one or more of the following:
      the number of TCI states indicated by the TCI state indicator; and
      the number of pairs of QCL relationships included in the one or more TCI states indicated by the TCI state indicator.
8. The method of embodiment 7, wherein each TCI state or each QCL pair corresponds to a transmission from a different source.
9. The method of any of embodiments 1-4, wherein:
   the first indication comprises first and second fields in the same DCI message;
   the first field identifies a superset of frequency-domain resource allocations for a plurality of transmission sources; and
   the second field identifies, for each transmission source, a subset of the superset identified by the first field.
9A. The method of any of embodiments 1-4, wherein:
   the first indication comprises a first set of bits and a second set of bits in a single field in the same DCI message;
   the first set of bits identifies a superset of frequency-domain resource allocations for a plurality of transmission sources; and
   the second set of bits identifies, for each transmission source, a subset of the superset identified by the first subset of bits.
10. The method of embodiments 9 or 9A, wherein the subset of the superset identified for each transmission source comprises the frequency-domain resource allocations, of the superset, that are not used for that particular transmission source.
11. The method of embodiment 3, wherein:
   the control message includes a configuration of frequency-domain resources associated with each of a plurality of PDSCH repetitions transmitted by a respective plurality of sources;
   the second indicator comprises a radio network temporary identifier (RNTI) associated with a PDCCH; and
   the number of frequency-domain resource allocations are determined to be:
      the number of repetitions configured in the control message, if the RNTI is associated with a first type of data service; and
      one if the RNTI is not associated with the first type of data service.
12. The method of embodiment 3, wherein:
   the control message includes a plurality of redundancy version (RV) configurations, each RV configuration associating one or more RVs of a single data block with a plurality of PDSCH repetitions transmitted by a respective plurality of sources;

the second indications include an RV indicator that identifies a particular RV configuration included in the control message; and the number of frequency-domain resource allocations are determined based on the number of RVs, of the single data block, that are included in the particular RV configuration.

13. The method of embodiment 3, wherein:

the control message includes a plurality of antenna port (AP) configurations, each AP configuration identifying one or more demodulation reference signal (DM-RS) associated with a plurality of PDSCH repetitions transmitted by a respective plurality of sources;

the second indications include an AP indicator that identifies a particular AP configuration included in the control message; and the number of frequency-domain resource allocations are determined based on the number of DM-RS ports included in the particular AP configuration.

14. A method for a wireless communication network in communication with a user equipment (UE), the method comprising one or more of:

transmitting the following to the UE:
a first indication of one or more frequency-domain resource allocations for reception of one or more subsequent physical downlink shared channel (PDSCH) transmissions; and one or more second indications of further characteristics of the subsequent PDSCH transmissions, wherein at least a portion of the further characteristics are related to the number of frequency-domain resource allocations indicated by the first indication;

subsequently transmitting the one or more PDSCH to the UE according to the indicated frequency-domain resource allocations and the indicated further characteristics.

14A. The method of embodiment 14, wherein the first indication and one or more second indications are transmitted via a downlink message having one or more of the following characteristics:

a single message;

transmitted via a single physical downlink control channel (PDCCH);

transmitted via a DCI scheduling grant; and transmitted within a single DCI scheduling grant field.

15. The method of any of the above embodiments, further comprising transmitting a higher-layer control message including one or more further characteristics of subsequent PDSCH transmissions, wherein at least a portion of the further characteristics are related to the number of frequency-domain resource allocations identified by the first indication.

16. The method of any of the above embodiments, wherein:

the first and second indications are transmitted in a single downlink control information (DCI) message, and the second indications include one or more of the following:

traffic profile indicator field in the single DCI message;

transmit control indicator (TCI) state field in the single DCI message;

redundancy version (RV) field in the single DCI message;

antenna ports (AP) indicator field in the single DCI message; and radio network temporary identifier (RNTI) associated with the PDCCH.

17. The method of embodiment 15, wherein:

the control message includes a plurality of traffic profiles, each traffic profile including a plurality of characteristics related to a particular type of data service;

the second indications include a traffic profile indicator that identifies a particular one of the plurality of traffic profiles included in the control message; and the number of frequency-domain resource allocations comprising the first indication are:

greater than one if the traffic profile indicator identifies a traffic profile associated with a first type of data service; and one if the traffic profile indicator identifies a traffic profile associated with a second type of data service.

18. The method of embodiment 17, wherein the first type of data service is enhanced mobile broadband (eMBB) and the second type of data service is ultra-reliable low-latency communications (URLLC).

19. The method of embodiment 15, wherein:

the control message includes a plurality of traffic control indicator (TCI) states, each TCI state including one or more pairs of source reference signal (RS) quasi-colocation (QCL) relationships;

the second indications include a TCI state indicator that identifies one or more of the TCI states included in the control message; and the number of frequency-domain resource allocations comprising the first indication are related to one or more of the following:

the number of TCI states indicated by the TCI state indicator; and the number of pairs of QCL relationships included in the one or more TCI states indicated by the TCI state indicator.

20. The method of embodiment 19, wherein each TCI state or each QCL pair corresponds to a transmission from a different source.

21. The method of any of embodiments 14-16, wherein:

the first indication comprises first and second fields in the same DCI message;

the first field identifies a superset of frequency-domain resource allocations for a plurality of transmission sources; and the second field identifies, for each transmission source, a subset of the superset identified by the first field.

21A. The method of any of embodiments 14-16, wherein:

the first indication comprises a first set of bits and a second set of bits in a single field in the same DCI message;

the first subset of bits identifies a superset of frequency-domain resource allocations for a plurality of transmission sources; and the second subset of bits identifies, for each transmission source, a subset of the superset identified by the first subset of bits.

22. The method of embodiments 21 or 21A, wherein the subset identified for each transmission source comprises the frequency-domain resource allocations, of the superset, that are not used for that particular transmission source.

23. The method of embodiment 15, wherein:
   the control message includes a configuration of frequency-domain resources associated with each of a plurality of PDSCH repetitions transmitted by a respective plurality of sources;
   the second indications include a radio network temporary identifier (RNTI) associated with a PDCCH; and
   the number of frequency-domain resource allocations comprising the first indication are:
      the number of repetitions configured in the control message, if the RNTI is associated with a first type of data service; and
      one if the RNTI is not associated with the first type of data service.

24. The method of embodiment 15, wherein:
   the control message includes a plurality of redundancy version (RV) configurations, each RV configuration associating one or more RVs of a single data block with a plurality of PDSCH repetitions transmitted by a respective plurality of sources;
   the second indications include an RV indicator that identifies a particular RV configuration included in the control message; and
   the number of frequency-domain resource allocations are related to the number of RVs, of the single data block, that are included in the particular RV configuration.

25. The method of embodiment 15, wherein:
   the control message includes a plurality of antenna port (AP) configurations, each AP configuration identifying one or more demodulation reference signal (DM-RS) associated with a plurality of PDSCH repetitions transmitted by a respective plurality of sources;
   the second indications include an AP indicator that identifies a particular AP configuration included in the control message; and
   the number of frequency-domain resource allocations are related to the number of DM-RS ports included in the particular AP configuration.

26. A user equipment (UE) configured to receive a plurality of physical downlink shared channels (PDSCHs) transmitted by different sources in a wireless communication network, the UE comprising:
   communication circuitry configured to communicate with the wireless communication network; and
   processing circuitry operatively associated with the communication circuitry and configured to perform operations corresponding to the methods of any of exemplary embodiments 1-13.

27. A radio access network (RAN) arranged to transmit a plurality of physical downlink shared channels (PDSCH) to a single user equipment (UE) via a plurality of transmission sources in the RAN, the RAN comprising:
   communication circuitry configured to communicate with the UE; and
   processing circuitry operatively associated with the communication circuitry and configured to perform operations corresponding to the methods of any of embodiments 14-25.

28. A non-transitory, computer-readable medium storing computer-executable instructions that, when executed by at least one processor of a user equipment (UE), configure the UE to perform operations corresponding to the methods of any of exemplary embodiments 1-13.

29. A non-transitory, computer-readable medium storing computer-executable instructions that, when executed by at least one processor comprising a radio access network (RAN), configure the RAN to perform operations corresponding to the methods of any of exemplary embodiments 14-25.

Group A Embodiments

A1. A method in a wireless device, where a number of frequency domain resource allocations in a single field in a DCI scheduling grant is determined by one or a combination of the following:
   a TCI field in the same DCI scheduling grant,
   a RV filed in the same DCI scheduling grant,
   an antenna ports field in the same DCI scheduling grant,
   one or more dedicated bits in the single field in the same DCI scheduling grant,
   a DCI field in the same DCI scheduling grant indicating a traffic profile,
   RRC configuration.

A2. The method of A1 where the number of frequency domain resource allocations is determined to be more than one if a combination of RRC configuration and the DCI field indicating traffic profile indicate a first type of traffic profile, and the number of frequency domain resource allocations is determined to be one if the combination of RRC configuration and the DCI field indicating traffic profile indicate a second type of traffic profile.

A3. The method of any of A1-A2 where the first type of traffic profile is URLLC and the second type of traffic profile is eMBB.

A4. The method of A1 where the number of frequency domain resource allocations is determined by a combination of RRC configuration and a number of TCI states indicated or a number of QCL pairs indicated by the TCI field.

A5. The method of A4 where each TCI state or each QCL pair corresponds to a transmission from a different TRP or a different panel.

A6. The method of A1 where the number of frequency domain resource allocations is determined using a first set of bits in the single field in the DCI scheduling grant and a second set of bits in the single filed in the DCI scheduling grant.

A7. The method of A6 wherein the first set of bits in the field indicate a superset of all scheduled resource blocks among the multiple TRPs.

A8. The method of A6 wherein the second set of bits in the field indicate a differential resource allocation corresponding to each TRP.

A9. The method of A1 where the number of frequency domain resource allocations is determined by a combination of RRC configuration and a number of RV values indicated by the RV field.

A10. The method of A1 where the number of frequency domain resource allocations is determined by a combination of RRC configuration and the sets of DMRS ports indicated by the antenna ports field.

A11. The method of A1 where the number of frequency domain resource allocations is determined by a combination of RRC configuration and the one or more dedicated bits in the single field in the same DCI scheduling grant.

Group B Embodiments

B1. A method in a wireless device, where a number of frequency domain resource allocations in a single field in a downlink message (e.g. a DCI scheduling grant) is determined by one or a combination of the following:
a TCI field in the same downlink message,
a RV field in the same downlink message,
an antenna ports field in the same downlink message,
one or more dedicated bits in the single field in the same downlink message,
a DCI field in the same downlink message indicating a traffic profile,
RRC configuration.

B2. The method of B1 wherein the number of frequency domain resource allocations is determined to be more than one if a combination of RRC configuration and a DCI field indicating the traffic profile indicate a first type of traffic profile, and/or the number of frequency domain resource allocations is determined to be one if the combination of RRC configuration and the DCI field indicating the traffic profile indicate a second type of traffic profile.

B3. The method of any of B1 where a first type of traffic profile is URLLC and a second type of traffic profile is eMBB.

B4. The method of B1 where the number of frequency domain resource allocations is determined by a combination of RRC configuration and a number of TCI states indicated or a number of QCL pairs indicated by the TCI field.

B5. The method of B4 where each TCI state or each QCL pair corresponds to a transmission from a different TRP or a different panel.

B6. The method of B1 where the number of frequency domain resource allocations is determined using a first set of bits in the single field in the downlink message and a second set of bits in the single filed in the downlink message.

B7. The method of B6 wherein the first set of bits in the field indicate a superset of all scheduled resource blocks among the multiple TRPs.

B8. The method of B6 wherein the second set of bits in the field indicate a differential resource allocation corresponding to each TRP.

B9. The method of B1 where the number of frequency domain resource allocations is determined by a combination of RRC configuration and a number of RV values indicated by the RV field.

B10. The method of B1 where the number of frequency domain resource allocations is determined by a combination of RRC configuration and the sets of DMRS ports indicated by the antenna ports field.

B11. The method of B1 where the number of frequency domain resource allocations is determined by a combination of RRC configuration and the one or more dedicated bits in the single field in the same downlink message.

C. A method for a base station for transmitting information allowing a wireless device to perform methods as in any of A1-A11 and B1-B11.

D. A wireless device comprising circuitry for performing methods as in any of A1-A11 and B1-B11.

E. A network node comprising circuitry for performing methods as in C.

The invention claimed is:

1. A method for a user equipment (UE) to receive physical data channel transmissions from a wireless network, the method comprising:
receiving, from the wireless network, configuration information including:
a first indication of one or more frequency-domain resource allocations for respective corresponding one or more physical data channel transmissions by respective corresponding one or more sources configured by the wireless network, and
one or more second indications of further characteristics of the physical data channel transmissions;
based on the second indications, determining the number of frequency-domain resource allocations indicated by the first indication; and
receiving, from the wireless network, the determined number of physical data channel transmissions based on the respective indicated frequency-domain resource allocations.

2. The method of claim 1, wherein the configuration information is received via a downlink message having one or more of the following characteristics:
a single message;
received via a single physical downlink control channel (PDCCH); and
received via a downlink control information (DCI) scheduling grant.

3. The method of claim 1, wherein determining the number of frequency-domain resource allocations is not based on the first indication.

4. The method of claim 1, wherein:
the first and second indications are received in a single downlink control information (DCI) message; and
the second indications are included in a transmission configuration indicator (TCI) state field of the DCI message, the TCI state field identifying one or more TCI states.

5. The method of claim 4, wherein:
the frequency domain resource allocations are non-overlapping; and
each non-overlapping frequency domain resource allocation is associated with a corresponding TCI state indicated by the second indications.

6. The method of claim 4, wherein:
each TCI state, indicated by the second indication, includes one or more source reference signal (RS) pairs;
each source RS pair has a corresponding pair of quasi-colocation (QCL) relations with antenna ports for demodulation reference signals (DM-RS);
the number of frequency-domain resource allocations indicated by the first indication are determined based on one or more of the following:
the number of TCI states indicated by the second indications; and
the number of pairs of QCL relations included in the TCI states indicated by the second indications.

7. The method of claim 6, wherein:
the configuration information also includes a third indication of a plurality of the antenna ports for DM-RS; and
the indicated plurality of antenna ports are associated with all frequency domain resource allocations indicated by the first indication.

8. The method of claim 6, wherein:
the one or more TCI states, indicated by the second indication, correspond to a code-division multiplexing, CDM, group that is associated with each of the physical data channel transmissions; and
each physical data channel transmission is received in association with DM-RS that have antenna ports with QCL relations included in the corresponding TCI state.

9. The method of claim 6, wherein the respective sources configured by the wireless network correspond to one of the following:
the respective TCI states indicated by the second indications; or
the respective pairs of QCL relationships included in the TCI states indicated by the second indications.

10. The method of claim 1, further comprising receiving, from the wireless network, a higher-layer control message including one or more further characteristics of the physical data channel transmissions, wherein determining the number of frequency-domain resource allocations identified by the first indication is further based on the one or more further characteristics.

11. The method of claim 10, wherein:
the higher-layer control message includes a plurality of transmission configuration indicator (TCI) states; and
the second indications include an indication of one or more of the TCI states included in the higher-layer control message.

12. The method of claim 1, wherein:
the method further comprises, based on the first indication and the determined number, determining one or more resource blocks within the one or more frequency domain allocations; and
receiving the determined number of physical data channel transmission is based on the determined resource blocks.

13. A method for a wireless network to perform physical data channel transmissions to a user equipment (UE), the method comprising:
transmitting, to the UE, configuration information including:
a first indication of one or more frequency-domain resource allocations for respective corresponding one or more physical data channel transmissions by respective corresponding one or more sources configured by the wireless network, and
one or more second indications of further characteristics of the physical data channel transmissions, wherein the number of frequency-domain resource allocations, indicated by the first indication, can be determined based on the one or more second indications; and
transmitting, to the UE, the physical data channel transmissions based on the respective indicated frequency-domain resource allocations and on the indicated further characteristics.

14. The method of claim 13, wherein the configuration information is transmitted via a downlink message having one or more of the following characteristics:
a single message;
received via a single physical downlink control channel (PDCCH); and
received via a downlink control information (DCI) scheduling grant.

15. The method of claim 13, wherein the number of frequency-domain resource allocations, indicated by the first indication, can be determined based on the one or more second indications without reference to the first indication.

16. The method of claim 13, wherein:
the first and second indications are transmitted in a single downlink control information (DCI) message; and
the second indications are included in a transmission configuration indicator (TCI) state field of the DCI message, the TCI state field identifying one or more TCI states.

17. The method of claim 16, wherein:
the frequency domain resource allocations are non-overlapping; and
each non-overlapping frequency domain resource allocation is associated with a corresponding TCI state indicated by the second indications.

18. The method of claim 16, wherein:
each TCI state, indicated by the second indication, includes one or more source reference signal (RS) pairs;
each source RS pair has a corresponding pair of quasi-colocation (QCL) relations with antenna ports for demodulation reference signals (DM-RS);
the number of frequency-domain resource allocations indicated by the first indication can be determined based on one or more of the following:
the number of TCI states indicated by the second indications; and
the number of pairs of QCL relations included in the TCI states indicated by the second indications.

19. The method of claim 18, wherein:
the configuration information also includes a third indication of a plurality of the antenna ports for DM-RS; and
the indicated plurality of antenna ports are associated with all frequency domain resource allocations indicated by the first indication.

20. The method of claim 18, wherein:
the one or more TCI states, indicated by the second indication, correspond to a code-division multiplexing (CDM) group that is associated with each of the physical data channel transmissions; and
each physical data channel transmission is transmitted in association with DMRS that have antenna ports with QCL relations included in the corresponding TCI state.

21. The method of claim 18, wherein the respective sources in the wireless network correspond to one of the following:
the respective TCI states indicated by the second indications; or
the respective pairs of QCL relationships included in the TCI states indicated by the second indications.

22. The method of claim 13, further comprising transmitting, to the UE, a higher-layer control message including one or more further characteristics of the physical data channel transmissions, wherein the number of frequency-domain resource allocations identified by the first indication is further based on the one or more further characteristics.

23. The method of claim 22, wherein:
the higher-layer control message includes a plurality of transmission configuration indicator (TCI) states; and
the second indications include an indication of one or more of the TCI states included in the higher-layer control message.

24. A user equipment (UE) configured to receive physical data channel transmissions from a wireless network, the UE comprising:

radio transceiver circuitry configured to communicate with a plurality of nodes in the wireless network; and processing circuitry operatively coupled to the radio transceiver circuitry, whereby the processing circuitry and the radio transceiver circuitry are configured to perform operations corresponding to the method of claim 1.

25. A non-transitory, computer-readable medium storing computer-executable instructions that, when executed by processing circuitry of a user equipment (UE) configured to receive physical data channel transmissions from a wireless network, configure the UE to perform operations corresponding to the method of claim 1.

26. A wireless network comprising one or more nodes, the wireless network being configured to perform physical data channel transmissions to a user equipment (UE), the one or more nodes comprising:

radio network interface circuitry configured to communicate with the UE; and processing circuitry operatively coupled to the radio network interface circuitry, whereby the processing circuitry and the radio network interface circuitry are configured to perform operations corresponding to the method of claim 13.

27. A non-transitory, computer-readable medium storing computer-executable instructions that, when executed by processing circuitry of one or more nodes in a wireless network configured to perform physical data channel transmissions to a user equipment (UE), configure the one or more nodes to perform operations corresponding to the method of claim 13.

* * * * *